(12) United States Patent
Awadh et al.

(10) Patent No.: US 11,807,554 B2
(45) Date of Patent: Nov. 7, 2023

(54) METHOD FOR REMOVING ORGANIC POLLUTANTS FROM CONTAMINATED WATER USING POLYSTYRENE-CARBON NANOFIBER COMPOSITION MADE FROM POST-CONSUMER WASTE

(71) Applicant: KING FAHD UNIVERSITY OF PETROLEUM AND MINERALS, Dhahran (SA)

(72) Inventors: Tawfik Abdo Saleh Awadh, Dhahran (SA); Nadeem Baig, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/211,775

(22) Filed: Dec. 6, 2018

(65) Prior Publication Data
US 2020/0180978 A1 Jun. 11, 2020

(51) Int. Cl.
*C02F 1/28* (2023.01)
*C08J 11/26* (2006.01)
(Continued)

(52) U.S. Cl.
CPC .............. *C02F 1/288* (2013.01); *C08J 3/2053* (2013.01); *C08J 11/26* (2013.01); *C08K 7/04* (2013.01);
(Continued)

(58) Field of Classification Search
CPC ................ C02F 1/288; C02F 2101/322; C02F 2101/325; C02F 2101/327; C02F 2305/08;
(Continued)

(56) References Cited

U.S. PATENT DOCUMENTS 5,932,091 A * 8/1999 Tompkins .......... B01D 17/0211
210/97
9,803,067 B1 10/2017 Al-Harthi et al.
(Continued)

FOREIGN PATENT DOCUMENTS

CN 102504432 A 6/2012
CN 108002488 A 5/2018

OTHER PUBLICATIONS

Ma, L.; Dong, X.; Chen, M.; Zhu, L.; Wang, C.; Yang, F.; Dong, Y. Fabrication and Water Treatment Application of Carbon Nanotubes (CNTs)-Based Composite Membranes: A Review. Membranes 2017, 7, 16. https://dx.doi.org/10.3390%2Fmembranes7010016 (Year: 2017).*

(Continued)

*Primary Examiner* — Bradley R Spies
*Assistant Examiner* — Jeannie McDermott
(74) *Attorney, Agent, or Firm* — Oblon, McClelland, Maier & Neustadt, L.L.P.

(57) ABSTRACT

Polystyrene waste, such as Styrofoam® waste, and carbon nanofibers may be used to produce highly hydrophobic compositions or composites that can separate oil and water. Methods for purifying an aqueous solution may include: passing the aqueous solution, including a hydrophobic organic substance, over or through a surface including a polystyrene-CNF composition, thereby producing an aqueous product including less of the hydrophobic organic substance; and optionally, passing the aqueous product over or through the surface at least one more time.

20 Claims, 20 Drawing Sheets

(51) Int. Cl.
  C08J 3/205   (2006.01)
  C08K 7/04    (2006.01)
  C02F 101/32  (2006.01)
  C08K 3/04    (2006.01)
(52) U.S. Cl.
  CPC .. *C02F 2101/322* (2013.01); *C02F 2101/325* (2013.01); *C02F 2101/327* (2013.01); *C02F 2305/08* (2013.01); *C08J 2325/06* (2013.01); *C08K 3/04* (2013.01)
(58) Field of Classification Search
  CPC ...... C08J 3/2053; C08J 11/26; C08J 2325/06; C08K 7/04; C08K 3/04
  See application file for complete search history.

(56) References Cited

U.S. PATENT DOCUMENTS

| | | |
|---|---|---|
| 2017/0240424 A1 | 8/2017 | Roberts et al. |
| 2019/0209976 A1* | 7/2019 | Livazovic ............ B01D 61/145 |

OTHER PUBLICATIONS

Zhuang, Guo-Liang & Tseng, Hui-Hsin & Wey, Ming-Yen. (2016). Feasibility of using waste polystyrene as a membrane material for gas separation. Chemical Engineering Research and Design. 111. 10.1016/j.cherd.2016.03.033. (Year: 2016).*

Gu, Jincui, (2014). Robust Preparation of Superhydrophobic Polymer/Carbon Nanotube Hybrid Membranes for Highly Effective Removal of Oils and Separation of Water-in-Oil Emulsions. J. Mater. Chem. A. 2. 10.1039/C4TA01603C. (Year: 2014).*

Castaldo R, Gentile G, Avella M, Carfagna C, Ambrogi V. Microporous Hyper-Crosslinked Polystyrenes and Nanocomposites with High Adsorption Properties: A Review. Polymers (Basel). Nov. 28, 2017;9(12):651. doi: 10.3390/polym9120651. PMID: 30965952; PMCID: PMC6418941. (Year: 2017).*

N. Baig, et al. "Initiator-Free Natural Light-Driven Vapor Phase Synthesis of a Porous Network of 3D Polystyrene Branched Carbon Nanofiber Grafted Polyurethane for Hexane/Water Separation" Chemistry Select, Jul. 30, 2018, pp. 1-2 (Abstract Only).

A. Rajak, et al. "Photocatalytic Activities of Electrospun TiO/Styrofoam Composite Nanofiber Membrane in Degradation of Waste Water" Materials Science Forum, vol. 827, Aug. 2015, pp. 1-2 (Abstract Only).

A. Mocanu, et al. "Electrochemical Deposition of Zinc Oxide on the Surface of Composite Membrane Polysulfone-Graphene-Polystyrene in the Presence of Water Soluble Polymers" Journal of Nanomaterials, vol. 2017, Mar. 9, 2017, pp. 1-12.

L. Zhang, et al. "Underwater superoleophobic carbon nanotubes/core-shell polystyrene@Au nanoparticles composite membrane for flow-through catalytic decomposition and oil/water separation" Journal of Materials Chemistry A, Issue 28, 2016, pp. 1-5 (Abstract Only).

* cited by examiner ac-CNF/SF$_{1:5}$ dipped into 2$^{nd}$ Vial

After 1$^{st}$ trial of separation

After 4th trial of separation

After 8th trial of separation

METHOD FOR REMOVING ORGANIC POLLUTANTS FROM CONTAMINATED WATER USING POLYSTYRENE-CARBON NANOFIBER COMPOSITION MADE FROM POST-CONSUMER WASTE

BACKGROUND

Field of the Invention

The invention pertains to the fields of plastic recycling and water purification including separation of oil from water.

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

Growth and rapid industrialization of civilization pose many environmental challenges. To maintain the healthy sustainability of life it is important to find new ways to address environmental problems caused by production of non-recyclable solid wastes.

Another significant environmental problem is the increasing contamination of water with oily wastes produced by food, aluminum, steel, petrochemical, metal finishing, textile and other industries. See Z. Xue, Y. Cao, N. Liu, L. Feng, L. Jiang, *Special wettable materials for oil/water separation*, J. Mater. Chem. A. 2 (2014) 2445-2460. doi:10.1039/C3TA13397D, incorporated herein by reference in its entirety.

The rapid offshore movements of oil, responding to fast-growing global energy demands, frequently results in oil spillages that further contaminate water resources. See Q. Ma, H. Cheng, A. G. Fane, R. Wang, H. Zhang, *Recent Development of Advanced Materials with Special Wettability for Selective Oil/Water Separation*, Small. 12 (2016) 2186-2202. doi:10.1002/smll.201503685, incorporated herein by reference in its entirety. Oil spillages and oily waste products represent significant health risks for humans, livestock and other animals, crops, and aquatic or marine life which is often the most vulnerable. See X. Zheng, Z. Guo, D. Tian, X. Zhang, W. Li, L. Jiang, *Underwater Self-Cleaning Scaly Fabric Membrane for Oily Water Separation*, ACS Appl. Mater. Interfaces. 7 (2015) 4336-4343. doi:10.1021/am508814g, incorporated herein by reference in its entirety. One prominent example of oil spill damage is the Exxon Valdez oil spill which occurred in Alaska on the 24 Mar. 1989 in Alaska. Almost 11 million US gallons of crude oil were released killing a huge number of bald eagles ($\approx$250), sea otters ($\approx$3,000) and sea birds ($\approx$250,000). See J. Lahann, *Environmental nanotechnology: Nanomaterials clean up*, Nat. Nanotechnol. 3 (2008) 320-321. doi:10.1038/nnano.2008.143, incorporated herein by reference in its entirety.

Taking into account the risks and damage caused by oil spills and contamination of water resources with oily wastes, numerous strategies have been attempted to efficiently separate oil and water or to remove oily materials from water. These include the use of membrane filtration, ultrathin films, fabrics, superhydrophobic foams, metal meshes. See S. Kasemset, Z. He, D. J. Miller, B. D. Freeman, M. M. Sharma, *Effect of polydopamine deposition conditions on polysulfone ultrafiltration membrane properties and threshold flux during oil/water emulsion filtration*, Polymer (Guildf). 97 (2016) 247-257. doi:10.1016/j.polymer.2016.04.064; H. Shi, Y. He, Y. Pan, H. Di, G. Zeng, L. Zhang, et al., *A modified mussel-inspired method to fabricate $TiO_2$ decorated superhydrophilic PVDF membrane for oil/water separation*, J. Memb. Sci. 506 (2016) 60-70. doi:10.1016/j.memsci.2016.01.053; K. Zhou, Q. G. Zhang, H. M. Li, N. N. Guo, A. M. Zhu, Q. L. Liu, *Ultrathin cellulose nanosheet membranes for superfast separation of oil-in-water nanoemulsions*, Nanoscale. 6 (2014) 10363. doi:10.1039/C4NR03227F; L. Hu, S. Gao, X. Ding, D. Wang, J. Jiang, J. Jin, et al., *Photothermal-Responsive Single-Walled Carbon Nanotube-Based Ultrathin Membranes for On/Off Switchable Separation of Oil-in-Water Nanoemulsions*, ACS Nano. 9 (2015) 4835-4842. doi:10.1021/nn5062854; S. J. Gao, Z. Shi, W. Bin Zhang, F. Zhang, J. Jin, *Photoinduced Superwetting Single-Walled Carbon Nanotube/$TiO_2$ Ultrathin Network Films for Ultrafast Separation of Oil-in-Water Emulsions*, ACS Nano. 8 (2014) 6344-6352. doi:10.1021/nn501851a; X. Zheng, et al.; J. Li, D. Li, W. Li, H. She, H. Feng, D. Hu, *Facile fabrication of three-dimensional superhydrophobic foam for effective separation of oil and water mixture*, Mater. Lett. 171 (2016) 228-231. doi:10.1016/j.matlet.2016.02.080; Z. Xue, S. Wang, L. Lin, L. Chen, M. Liu, L. Feng, et al., *A Novel Superhydrophilic and Underwater Superoleophobic Hydrogel-Coated Mesh for Oil/Water Separation*, Adv. Mater. 23 (2011) 4270-4273. doi:10.1002/adma.201102616; Y. Lu, S. Sathasivam, J. Song, F. Chen, W. Xu, C. J. Carmalt, et al., *Creating superhydrophobic mild steel surfaces for water proofing and oil-water separation*, J. Mater. Chem. A. 2 (2014) 11628-11634. doi:10.1039/C4TA02181A; F. Zhang, W. Bin Zhang, Z. Shi, D. Wang, J. Jin, L. Jiang, *Nanowire-Haired Inorganic Membranes with Superhydrophilicity and Underwater Ultralow Adhesive Superoleophobicity for High-Efficiency Oil/Water Separation*, Adv. Mater. 25 (2013) 4192-4198. doi:10.1002/adma.201301480; Q. Wen, J. Di, L. Jiang, J. Yu, R. Xu, *Zeolite-coated mesh film for efficient oil-water separation*, Chem. Sci. 4 (2013) 591-595. doi:10.1039/C2SC21772D, each incorporated herein by reference in its entirety. However, apart from all these methods, still there is still desperate need to develop more efficient, easy to use, and low cost materials and methods for the efficient removal of oil from water.

Carbon-based materials have been studied for the fabrication of hydrophobic materials for the separation of oil and water. See H. Bi, X. Xie, K. Yin, Y. Zhou, S. Wan, L. He, et al., *Spongy Graphene as a Highly Efficient and Recyclable Sorbent for Oils and Organic Solvents*, Adv. Funct. Mater. 22 (2012) 4421-4425. doi:10.1002/adfm.201200888, incorporated herein by reference in its entirety. D. Nguyen et al. used the facile dip coating method for the preparation of superhydrophobic and superoleophilic graphene-based sponges for the large-scale removal of organic contaminants See D. D. Nguyen, N.-H. Tai, S.-B. Lee, W.-S. Kuo, *Superhydrophobic and superoleophilic properties of graphene-based sponges fabricated using a facile dip coating method*, Energy Environ. Sci. 5 (2012) 7908. doi:10.1039/c2ee21848h, incorporated herein by reference in its entirety. Similarly, the multifunctional polymer based graphene foam was also used for the oil/water separation. See C. Wu, X. Huang, X. Wu, R. Qian, P. Jiang, *Mechanically Flexible and Multifunctional Polymer-Based Graphene Foams for Elastic Conductors and Oil-Water Separators*, Adv. Mater. 25

(2013) 5658-5662. doi:10.1002/adma.201302406, incorporated herein by reference in its entirety.

Raw-cotton-generated carbon fiber aerogel was used as a recyclable sorbent for the organic solvents and for oil as well. See H. Bi, Z. Yin, X. Cao, X. Xie, C. Tan, X. Huang, et al., *Carbon Fiber Aerogel Made from Raw Cotton: A Novel, Efficient and Recyclable Sorbent for Oils and Organic Solvents*, Adv. Mater. 25 (2013) 5916-5921. doi:10.1002/adma.201302435, incorporated herein by reference in its entirety.

In another work, polyurethane reinforced with carbon nanotubes was used for oil/water separation. See H. Wang, E. Wang, Z. Liu, D. Gao, R. Yuan, L. Sun, et al., *A novel carbon nanotubes reinforced superhydrophobic and superoleophilic polyurethane sponge for selective oil-water separation through a chemical fabrication*, J. Mater. Chem. A. 3 (2015) 266-273. doi:10.1039/C4TA03945A, incorporated herein by reference in its entirety.

Styrofoam® is a polystyrene, a polymer based on styrene. It is used worldwide in commerce and industry. See M. Jang, W. J. Shim, G. M. Han, M. Rani, Y. K. Song, S. H. Hong, *Styrofoam® Debris as a Source of Hazardous Additives for Marine Organisms*, Environ. Sci. Technol. 50 (2016) 4951-4960. doi:10.1021/acs.est.5b05485, incorporated herein by reference in its entirety. For example, it is used in the food service industry in the form of plates, cups and storage containers, used in the shipping industry as a packing material, and used as an insulation material.

Styrofoam® waste may cause health issues as it is formed from styrene polymerization. The EPA has stated that styrene is a suspected toxin and carcinogen to the respiratory, kidney and gastrointestinal tract. However, there is no clear proof or evidence that styrene is carcinogenic. See C. Loos, T. Syrovets, A. Musyanovych, V. Mailänder, K. Landfester, G. U. Nienhaus, et al., *Functionalized polystyrene nanoparticles as a platform for studying bio-nano interactions*, Beilstein J. Nanotechnol. 5 (2014) 2403-2412. doi:10.3762/bjnano.5.250, incorporated herein by reference in its entirety. In view of the increasing amounts of Styrofoam® waste products and potential health risks associated with them, the inventors sought to develop a new way to recycle these products thus converting them into useful raw materials rather than into wastes. The conversion of polystyrene wastes, such as Styrofoam® wastes, into useful products is encouraging to reduce waste into useful products and it is an efficient way to cope with chemical waste pollution. The fabrication process described by the inventors is simple, environmentally friendly and highly cost-effective and as further demonstrated herein, the material efficiently separates oil and water.

Accordingly it is one object of the invention to provide environmentally responsible and safe adsorbents, materials and methods for removing contaminants from water and other fluids.

BRIEF SUMMARY OF THE INVENTION

The inventors disclose herein the use of polystyrene wastes, such as Styrofoam® (e.g., expanded or foamed polystyrene) wastes, and carbon nanofibers to produce a composition or composite that can separate oil and water. Acetone was used to collapse and soften the physical structure of Styrofoam® (SF). Styrofoam® itself does not display a highly hydrophobic surface, however, after its combination with carbon nanofibers (CNF) its surface hydrophobicity was found to substantially increase and the surface became highly oleophilic and useful for oil and water separation.

The inventors developed a simple and extremely cost-effective acetone-assisted process for impregnating polystyrenes with carbon nanofibers (CNFs) thus transforming Styrofoam® wastes into a highly hydrophobic material which can be employed for separation of oil and water.

The inventors disclose an acetone-assisted carbon nanofiber impregnation method of forming a nanofiber impregnated polystyrene (e.g., Styrofoam®) (ac-CNF/SF) that is a highly hydrophobic and oleophilic material and can be used to efficiently separate oil and water. Styrofoam® was initially collapsed by treatment with acetone to momentarily soften the Styrofoam®. The softened styrofoam spontaneously impregnates with carbon nanofibers. The impregnation of CNF into ac-SF drastically increased the hydrophobicity of the surface and the surface area of the resulting composition. The ac-CNF/SF was characterized by SEM, FTIR and the BET. CNF impregnation increased the contact angle (CA) of the polystyrene approximately from $74.29°\pm0.18°$ to $154.39°\pm2.35°$ and the surface area from 14 to 139 $m^2/g$. The ac-CNF/$SF_{1:5}$ was successfully applied for the complete separation of hexane and the oil mixture and shown to exhibit good stability in a real sample of oil.

The foregoing paragraphs have been provided by way of general introduction, and are not intended to limit the scope of the following claims The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A-3B: ac-SF,
FIG. 3C-3D: ac-CNF/$SF_{1:50}$,
FIG. 3E-3F: ac-CNF/$SF_{1:25}$,
FIG. 4G-3H: ac-CNF/$SF_{1:10}$,
and FIG. 4I-4J: ac-CNF/$SF_{1:5}$.
FIGS. 3B, 3D, 3F, 3H and 3J graphically depict contact angles shown in FIGS. 3A, 3C, 3E, 3G and 3I, respectively.

DETAILED DESCRIPTION OF THE INVENTION

Figure 1A:
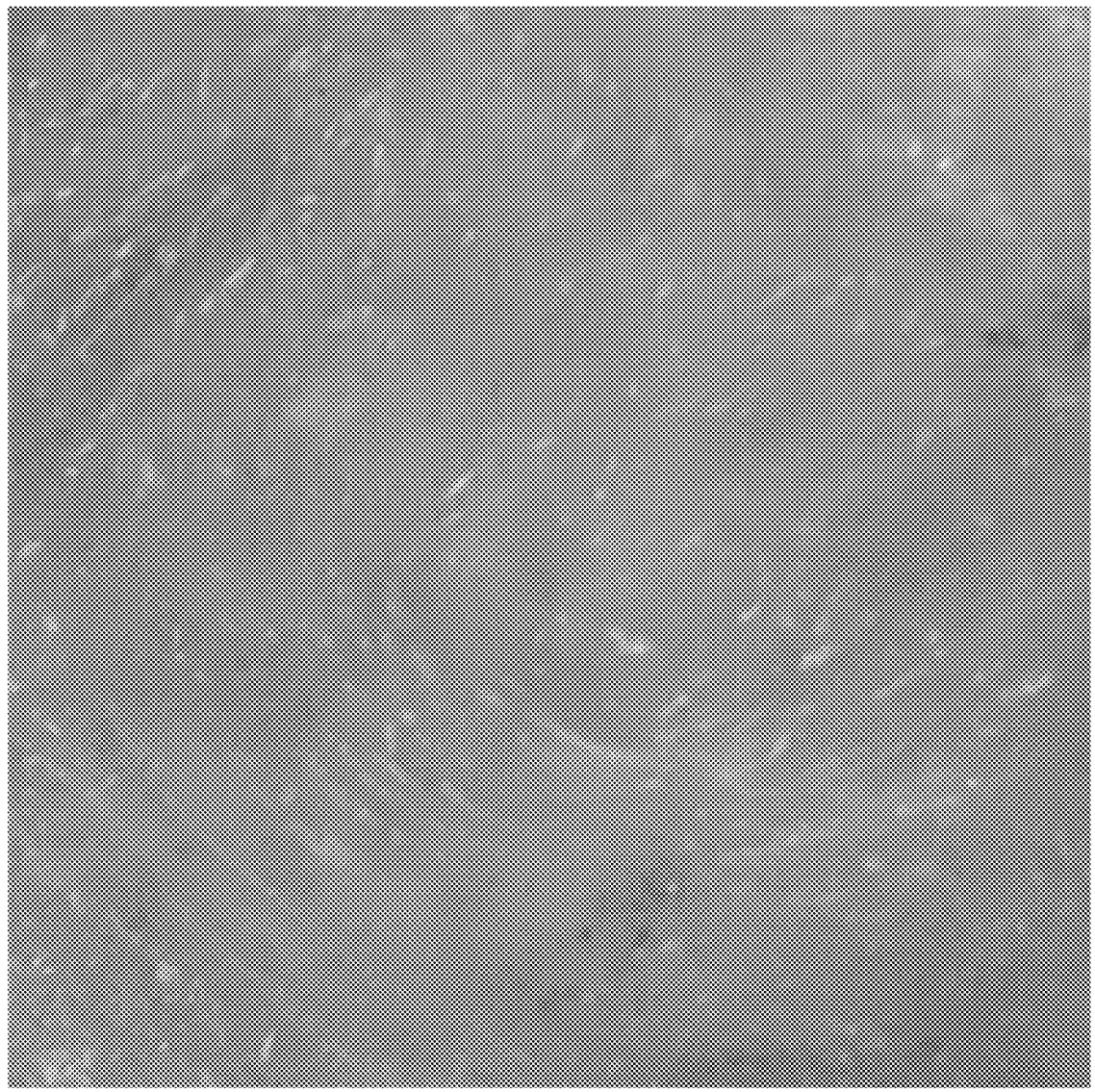
FIG. 1A. The surface morphology of the ac-SF.
Figure 1B:
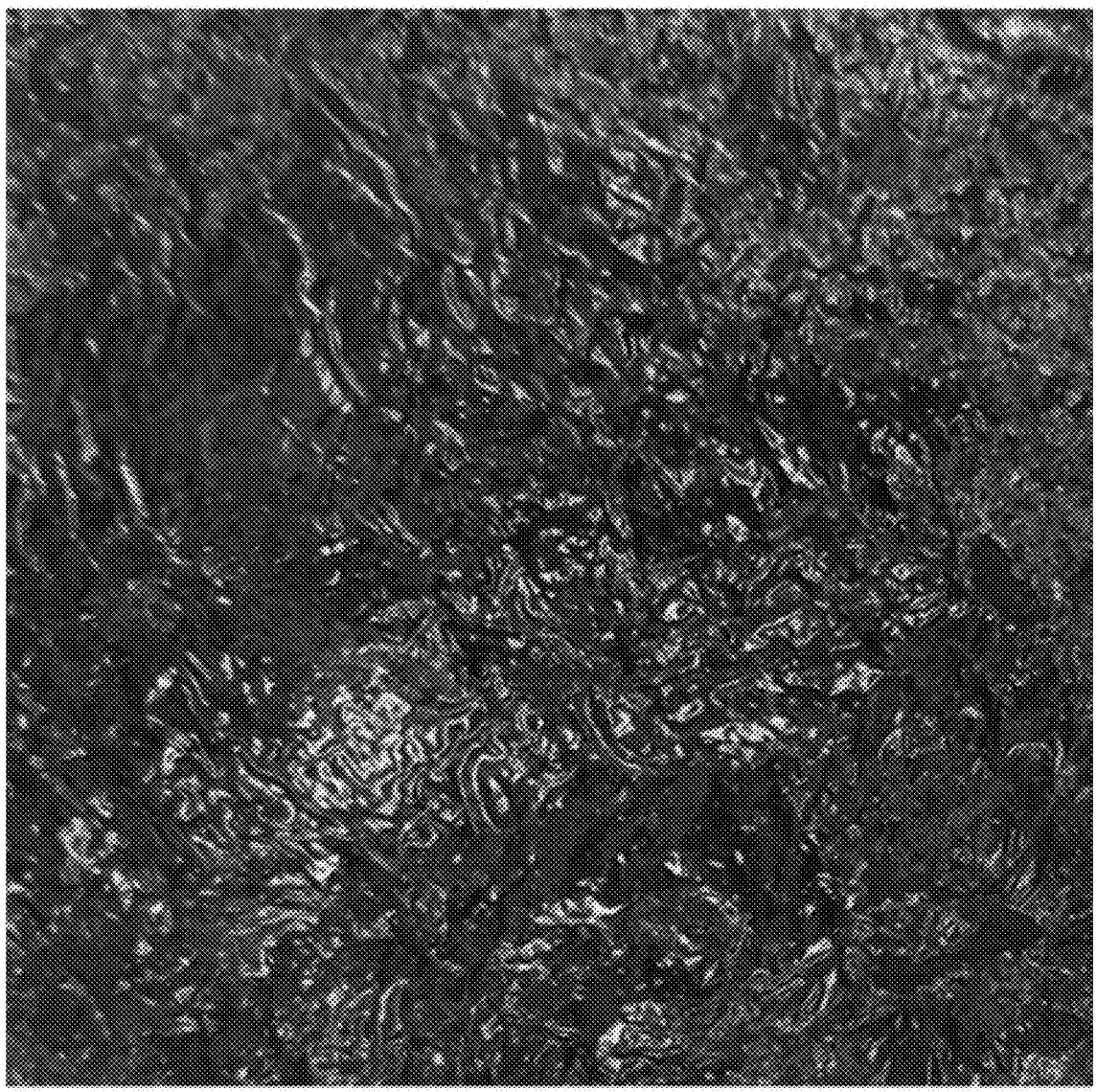
FIG. 1B. The surface morphology of ac-CNF/$SF_{1:50}$.
Figure 1C:
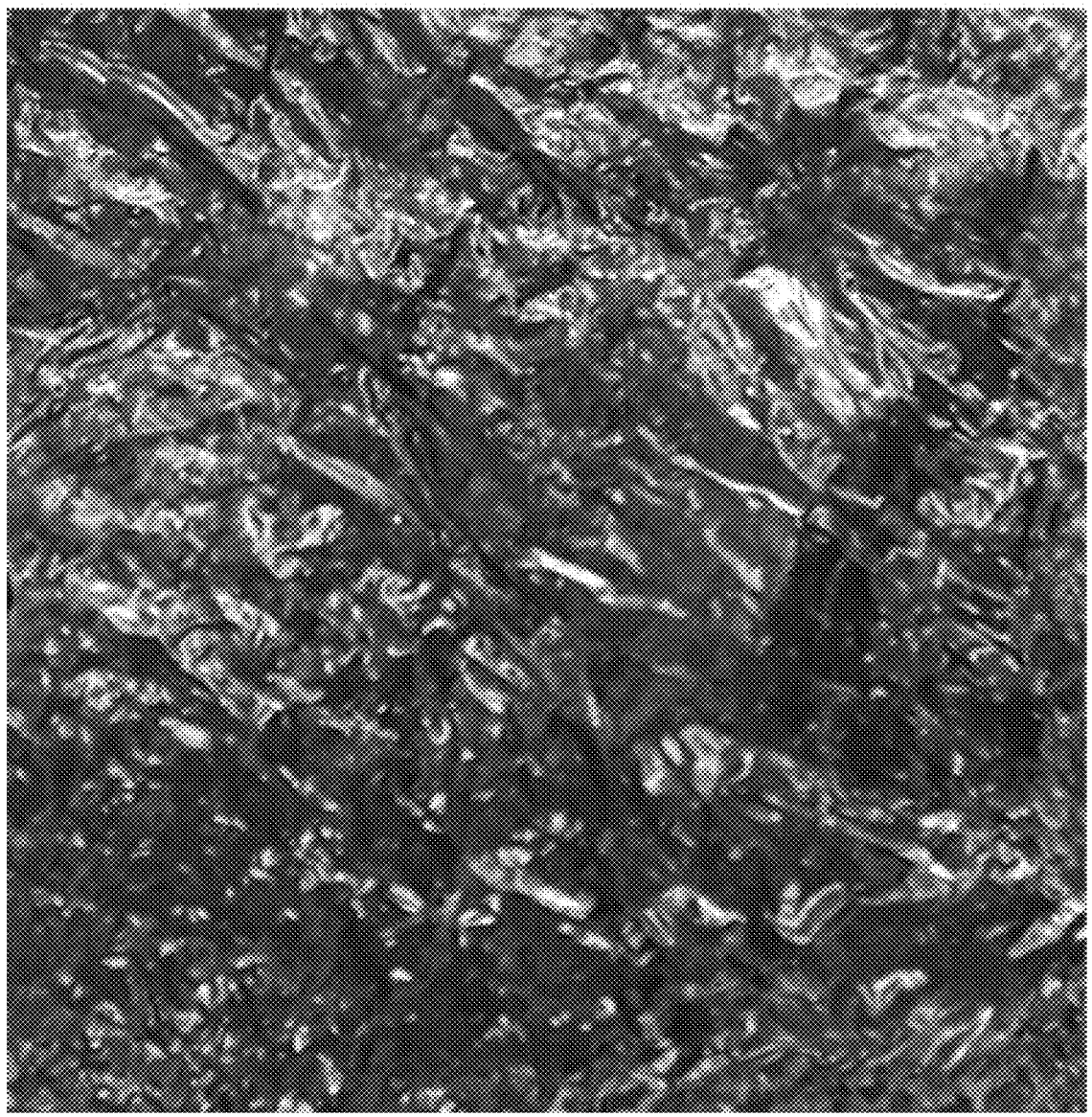
FIG. 1C. The surface morphology of the ac-CNF/$SF_{1:25}$.
Figure 1D:
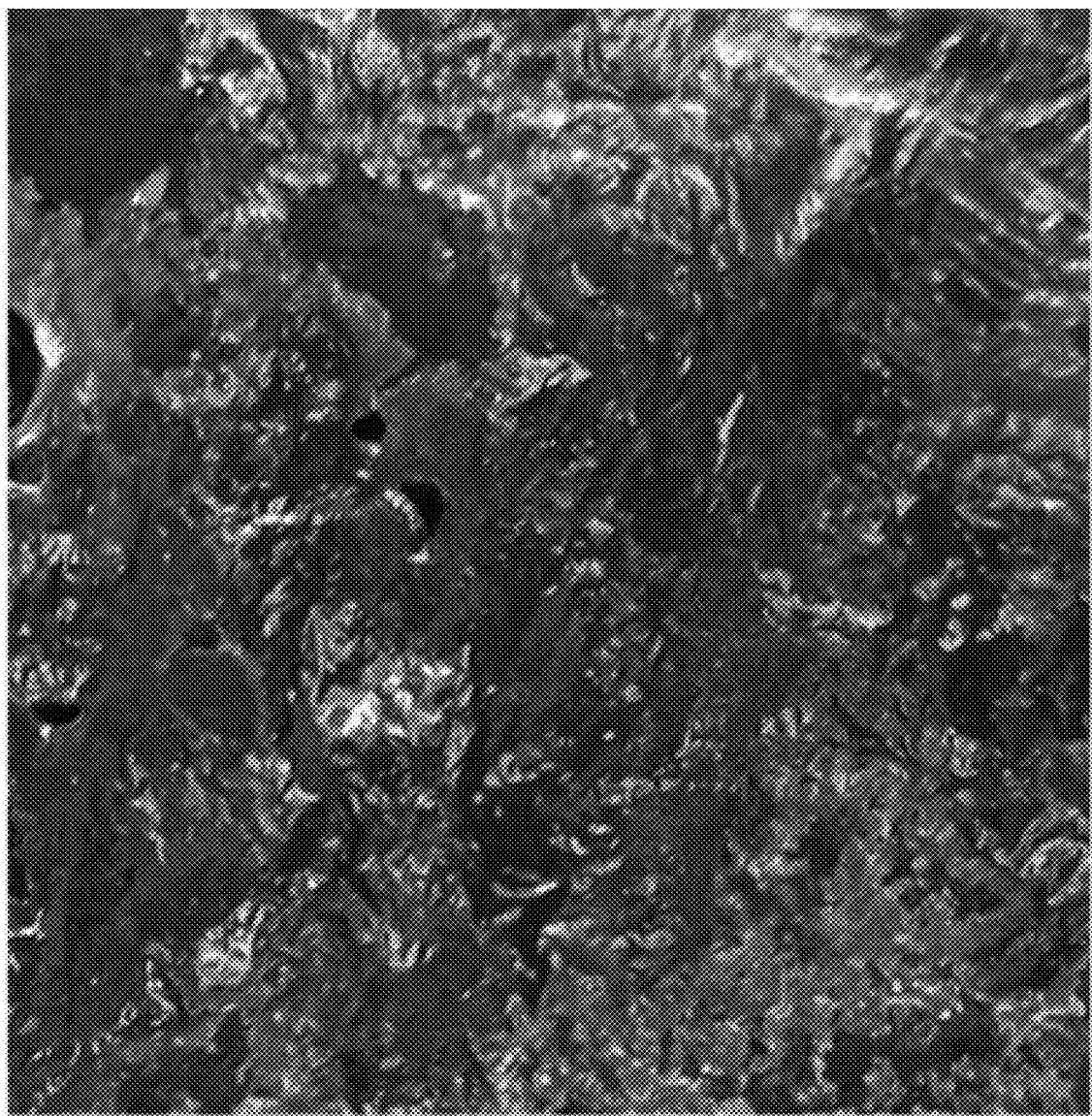
FIG. 1D. The surface morphology of) ac-CNF/$SF_{1:10}$.
Figure 1E:
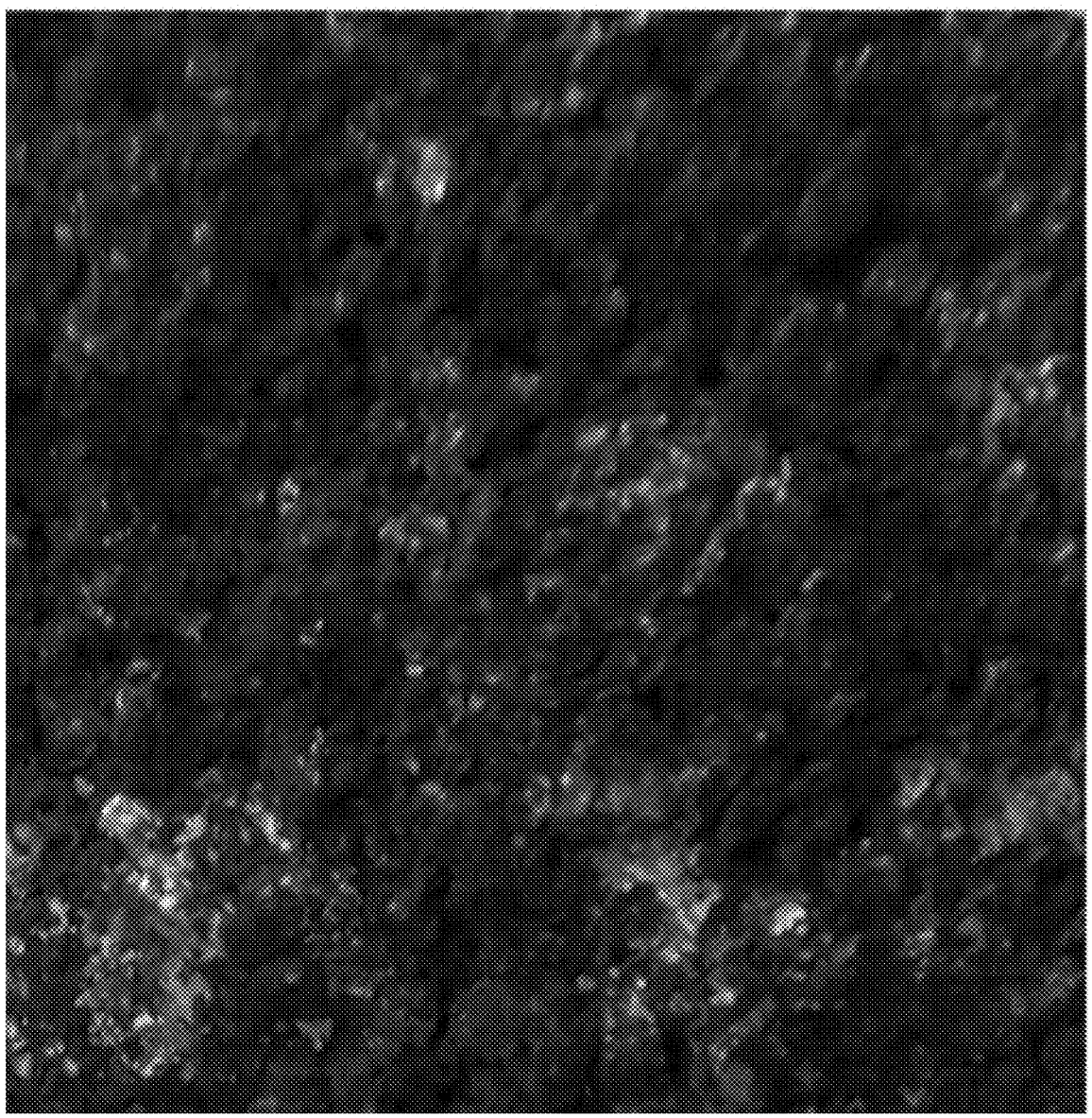
FIG. 1E. The surface morphology of ac-CNF/$SF_{1:5}$
FIGS. 2A-2E. SEM images at a lower magnification (500 μm) of the hydrophobic composite (a) ac-SF, (b) ac-CNF/$SF_{1:50}$, (c) ac-CNF/$SF_{1:25}$, (d) ac-CNF/$SF_{1:10}$(e) ac-CNF/$SF_{1:5}$.

A large amount of polystyrene, such as Styrofoam®, wastes are generated as these materials are abundantly used as packing or packaging materials and in the insulation and food service industries. After a single use Styrofoam® is generally disposed of without recycling. The sheer volume of such waste materials and the lack of an economical recycling processes or secondary uses causes significant environmental and waste disposal problems. In view of these problems, the inventors sought to develop a way to convert polystyrene wastes into a form that could be reused to produce valuable commercial products and to reduce the environmental burden caused by polystyrene wastes.

Polystyrenes, such as Styrofoam®, are good insulation materials because they contain a significant amount of trapped air which is a poor conductor of heat. The inventors found a simple and economic way to separate such insulating polystyrenes from the air they contain by contacting them with acetone. Acetone not only frees trapped air from these materials, it also softens and renders them malleable. Furthermore, the softened and malleable polystyrene is quite suitable for further incorporation of, or impregnation with, additional materials such as carbon nanofibers.

Polystyrenes include soft and hard polystyrenes, extruded polystyrene foam as well as expanded polystyrene foams. One type of polystyrene is trademarked by Dow Chemical Co. as Styrofoam®. A generic term for Styrofoam® is "extruded polystyrene foam". It will be understood that for most purposes of the invention an equivalent extruded polystyrene foam may be used in place of Styrofoam®. Preferably an unmodified polystyrene is employed in the compositions of the invention. In other embodiments a modified polystyrene, such as a sulfonated polystyrene, may be used.

Polystyrene is a synthetic resin which is a polymer of styrene, used chiefly as lightweight rigid foams and films. It comprises the following chemical structure where n is the number of styrene units:

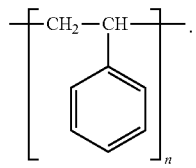

As a thermoplastic polymer, polystyrene is in a solid (glassy) state at room temperature but flows if heated above about 100° C., its glass transition temperature. It becomes rigid again when cooled. This temperature behavior is exploited for extrusion (as in Styrofoam®) and also for molding and vacuum forming, since it can be cast into molds with fine detail. Polystyrene has a density ranging from about 0.96 to 1.04 g/cm$^3$, a melting point of about 240° C., and a Tg of about 90° C. (atatic form Expanded polystyrene (EPS) has a density ranging from 16-640 kg/m$^3$, a Tg of about 100° C., a Vicat softening point of about 90° C. Other physical properties of polystyrenes are incorporated by reference to https://_en.wikipedia.org/wiki/Polystyrene (last accessed Oct. 3, 2018) and the references cited thereby.

Polystyrene is chemically inert, being resistant to acids and bases but is easily dissolved by many chlorinated solvents, and many aromatic hydrocarbon solvents. Because of its resilience and inertness, it is used for fabricating many objects of commerce. It is attacked by many organic solvents, which dissolve the polymer. Like all organic compounds, polystyrene burns to give carbon dioxide and water vapor. Polystyrene, being an aromatic hydrocarbon, typically combusts incompletely as indicated by a sooty flame.

Polystyrene is slow to biodegrade and is therefore a focus of controversy among environmentalists. It is increasingly abundant as a form of litter in the outdoor environment, particularly along shores and waterways, especially in its foam form, and also in increasing quantities in the Pacific Ocean.

Polystyrene and Styrofoam® wastes include insulation, packing, and packaging materials. Examples include packing blocks used to encase breakable items, coolers and refrigerated containers, packing peanuts, and food and beverage containers like egg crates, cups, lids, plates, carry-out containers, and utensils. In some embodiments, polystyrene or Styrofoam® wastes are lacerated, torn, shredded, or ground prior to further processing. Other common products containing polystyrenes include disposable razors, plastic yogurt containers, plastic mailers and CD jewel cases. Preferably, a resin consisting of, or consisting essentially of, polystyrene is used as a starting material and may contain conventional additives incorporated into Styrofoam®. In other embodiments, mixtures of polystyrene with other resins, or polystyrene copolymers, such as poly(styrene-co-methylmethacrylate) may be used.

Post-consumer waste. Preferably, the polystyrene, such as Styrofoam, used in the invention is post-consumer waste polystyrene, though pre-consumer waste, such as manufacturing scraps or remnants may be used. A post-consumer waste is a waste type produced aby the end consumer in a material stream and is routinely discarded in a waste receptacle or dump, by littering, or by incineration. Post-consumer waste generally is contaminated with paints, inks, dyes, adhesives, foods, paper or plastic scraps, water-soluble wastes, organic compounds, sugars, starches, proteins, oils or other lipids or other waste products. In some instances, post-consumer waste polystyrene will contain leachable chemicals such as styrene monomers or diethylehexyl adipate.

It may be partially degraded or chemically modified by its prior use or by exposure to tearing, shredding or other physical degradation, heat or cold, water or other solvents, oxygen or other gases, or by exposure to microwaves, sunlight, UV or other radiation. In some embodiments, post-consumer waste will be cleaned to remove all or a portion of these waste products, for example, to reduce the amount of waste products present on the polystyrene to no more than 0.01, 0.02, 0.05, 0.1, 0.2, 0.5, 1.0, 2.0, 5 or 10 wt % of the total weight of the waste polystyrene or any intermediate value within this range.

Acetone (propanone) is an organic compound with the formula $(CH_3)_2CO$. It is a colorless, volatile, flammable liquid, and is the simplest and smallest ketone. It is a polar, aprotic solvent that is miscible with water. In some embodiments of the method disclosed herein, another ketone or organic solvent may be substituted for all or part of the acetone. In the invention, acetone is used to collapse polystyrenes, especially extruded or expanded polystyrenes like Styrofoam®.

Carbon nanofibers (CNFs) include both vapor grown carbon fibers (VGCFs) and vapor grown carbon nanofibers (VGCNFs). These are typically cylindrical nanostructures with graphene layers arranged as stacked cones, cups or plates. Carbon nanofibers may be solid or hollow. Carbon nanofibers with graphene layers wrapped into cylinders are called carbon nanotubes (CNTs). CNTs may be single-walled or multiwalled nanotubes. CNFs may have outer diameters ranging from about 1, 2, 5, 10, 20, 50, 100, 200, 500, or <1,000 nm. CNFs may be untreated or may be further treated with one or more films, coatings or absorptive materials. CNFs may be further functionalized. Carbon nanofibers and methods of their production are further described by, and incorporated by reference to https://_en.wikipedia.org/wiki/Carbon_nanofiber (last accessed Sep. 25, 2018). Various forms of carbon nanofibers or carbon nanotubes and methods for producing or dispersing them are incorporated by reference to Rouse, U.S. Pat. No. 8,414,792. When incorporated into polymeric composites, carbon nanofibers can increase the tensile strength, compression strength, Young's modulus, interlaminar shear strength, fracture toughness, and vibration damping of a polystyrene composition compared to an identical polystyrene composition not containing the CNFs.

Other impregnating materials. In some alternative embodiments, all or part of the CNFs may be replaced by other materials. Such materials include a carbon fiber-reinforced graphite material, a graphite sheet, graphite nanoplate, a fullerene, a carbon nanohorn, hydrophobic silica, hydrophobic cellulose, hydrophobic lignocellulose, as well as other hydrophobic or superhydrophobic fillers. Other nanoparticle materials include a nanoclay, a polyhedral oligomeric silsesquioxane (POSS), a nanoparticle mineral, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, or combination of the above ingredients, including combinations containing CNFs or CNTs.

Membranes and filters. A CNF impregnated polystyrene composition according to the invention may be shaped into various forms, such as into a membrane or filter. A membrane or filter may have a thickness ranging from 10, 20, 50, 100, 200, 500 or >500 mm.

Carbon nanofiber dispersing includes forming a dispersion of carbon nanofibers in a solvent such as acetone or in another dispersive medium by sonication. The sonicator can be a bath sonicator, such as those by Branson, or a sonicating horn design from companies such as Hielscher Inc. or Misonix, Inc. Media milling may also be used. For example, a given amount of CNF is added to a solvent and subjected to the media milling process for a given period of time. Examples of media milling technology includes ball mills, circulation mills (optionally with centrifugal flow), internally agitated high energy media mills (such as the SDM-series attritors from Union Process, Akron, Ohio or PRK batch attritors from Netzsch Fine Particle Technology, Exton, Pa.), continuous attritors, horizontal or vertical disc mills, basket mills and Perl Mills (from Buhler AG, Uzwil, Switzerland). Another method for preparing a dispersion of CNFs in a solvent or dispersive medium is by high shear mixing. An apparatus such as a Dispermat with appropriate blade, a homogenizer, or a rotostat are applicable for preparation of such dispersions.

Melt-mixing may be used to disperse CNFs directing into a polystyrene, optionally in the presence of a small amount of solvent, such as acetone. Apparatus made by Brabender GmbH & Co. and Xaloy, Inc. may be used. Any other known method of preparing CNF dispersions either in solvent or in a solid matrix such as that made from waste polystyrene may be employed. The amount of time required to obtain a satisfactory dispersion utilizing the methods described above is dependent on parameters such as CNF loading, CNF type, type, nature of polystyrene matrix, type of equipment and can range from a few seconds to minutes, for example, from 5, 15, 30, 60 seconds or from 1, 5, 10, 20, 30, 40, 50, 60, or 120 minutes or more.

Water to be treated. The composition of the invention may be used to separate oil and other organic compounds from water. Such compounds include both aromatic and long- and short-chain aliphatic hydrocarbons as well as other components of crude and refined petroleum such as volatile organic compounds (VOCs) like benzene, toluene and xylenes, and polycyclic aromatic hydrocarbons (PAHs).

Water in need of treatment may include water containing one or more of these contaminants that is used to produce water for commercial, industrial or agricultural use as well as drinking water for humans or animals. In some instances, water is ground water such as taken from a well in others it is taken from a reservoir, river, stream or lake. Contaminated water includes water from commercial, industrial or agricultural activities that contains oil, hydrocarbons or other organic compounds. This includes storm water, effluent from roads or tarmacs, bilge water, water from car washes, and flow back water (FBW) or produced water (PW) derived from petroleum recovery including from unconventional hydrocarbon production such as fracturing procedures. Oil, hydrocarbon, or other organic compound content in water may range from 1, 2, 5, 10, 15, 20, 50, 100, 200, 250, 500, 1,000, 2,000 or >2,000 ppm oil, or other organic compound. In some cases, the amount of oil will be at or below its saturation limit for water (or other aqueous solution), for example, at no more than 50-250 ppm. Oil in water may be in a dissolved, emulsified or free state.

In some embodiments, the bulk of oil or other hydrophobic contaminants may be removed by phase separation and the aqueous phase may be further purified using a composition according to the invention.

In other embodiments, the oil may be in a form of an emulsion and the composition of the invention will be employed to help dissociate or break the emulsion. For example, the SF-CNF composition of the invention can remove sufficient oil from a water and oil emulsion to permit the mixture when subjected to conditions that sediment and facilitate coalescence of emulsified oil and water drops to separate into oil and water. Such conditions may be provided by at least one of a mechanical settler, cyclone or centrifuge. The water phase may be further purified by contacting it again with a SF-CNF composition to remove or reduce residual oil in the water phase.

Water or waste-water treatment methods using the CNF impregnated polystyrene compositions of the invention involve contacting water containing a contaminant with the composition under conditions where hydrophobic contaminants bind to the composition. Methods that may be used by, or used in conjunction with, the invention include adsorption, screening, filtration, flotation, sedimentation/gravity separation, precipitation, oxidation, reverse osmosis, coagulation, evaporation, solvent extraction, distillation, crystallization, ion exchange, electrodialysis, centrifugation, and/or electrolysis. They may be used in conjunction with other methods that remove heavy metals such as lead, mercury or arsenic, or other water pollutants. In some embodiments they are used in combination with the treatment methods disclosed by US20170158528A1 entitled Cross-linked polymeric resin and methods for wastewater treatment; US20170341955A1, entitled Cross-linked polymeric resin and methods for wastewater treatment; U.S. Pat. No. 9,796,604B2, entitled Cross-linked (bisphenol-S, formaldehyde, 1,6-hexadiamine) terpolymer for the adsorption of $Pb^{2+}$ ions from aqueous solutions"; and U.S. Pat. No. 9,878,923B1, entitled Adsorbent comprising bisphenol, formaldehyde and hexadiamine terpolymer with adsorbed Pb; each of which is incorporated by reference.

Regeneration or defouling of composition of the invention. After having bound oil or another hydrophobic contaminant the CNF/SF composition according to the invention may be stripped, defouled, or regenerated so as to increase its capacity to bind to more hydrophobic contaminants. In some embodiments, bound contaminants may be removed using surfactants, acid treatment, base treatment, or by other chemicals that release the contaminant from the composition of the invention permitting their removal. In other embodiments, they may be removed from a composition according to the invention, such as a membrane to which hydrophobic contaminants have bound, using pressurized air or water.

Oil and water separators. The composition of the invention may be incorporated into an oil and water separator including, but not limited to, an oil water separator, oily water separator, marine oil water separator, oil water separator system, marine oil water separators, bilge oil water separator, bilge oil water separator, air compressor oil water separator, storm water oil water separator, oil water separator, underground oil water separator, portable oil water separator, above ground oil water separator, car wash oil water separator, or mobile oil water separator. Separator apparatuses and their component elements are known in the art as evident from http://_www.pacificmarine.net/engineering/oil-water-separators.htm (last accessed Oct. 3, 2018, incorporated by reference). A separator may be configured to output water with less than 100, 50, 20, 10, 5, 2, or 1 ppm oil.

The invention includes, but is not limited to the embodiments described below.

In one embodiment, the invention is directed to a composition or composite including polystyrene impregnated or mixed with carbon nanofibers. The composition may contain a ratio (wt. %/wt. %) of carbon nanofibers to polystyrene ranging from 1:100, 1:50, 1:40, 1:30, 1:20, 1:10, 1:5, 1:2.5, 1:2 or 1:1 or any intermediate value in between. In some embodiments, the composition may contain more CNF that polystyrene.

In some embodiments, exemplified herein, the CNF are impregnated into the surface of an intact layer of collapsed polystyrene (SF). Impregnation may produce a relatively uniform or non-uniform (patchy) distribution of CNF on the surface of the SF-CNF composition. Distribution of CNF on the surface of the polystyrene-CNF (e.g., SF-CNF) may be modified by adjusting the thickness, smoothness or shape of the collapsed polystyrene layer, the concentration of CNF applied and the time of contact between the dispersed CNF and the collapsed polystyrene.

In some embodiments the carbon nanofibers agglomerate as islands on the surface of the polystyrene. The islands may represent elevated areas (in the form of concave) that are formed by carbon stacked nanofibers and held together with a matrix or adhesive amounts of polystyrene. Such islands which may have a height that extends from 3 to 10 diameters of carbon nanofibers high from the mean service of the membrane can be present at a density of from 10-1000, preferably 100-500, 200-300 per square centimeter. The diameter of these stacked carbon nanofiber agglomerates may be from 2-50, preferably 5-25 or about 10 times the average length of the carbon nanofibers. In other embodiments the carbon nanofibers are arranged in wavelike patterns separated by a distance that is 0.9-0.1, preferably about 0.5 times the average length of the carbon nanofibers. In the aforementioned embodiments the carbon nanofibers lay generally flat on the surface. In other embodiments carbon nanofibers protrude directly from the surface individually or in groups. In this embodiment carbon nanofibers may be impaled orthogonally to the surface such that a portion of the carbon nanofiber protrudes therefrom.

The carbon nanofibers may be incorporated into a mass of polystyrene or into one or more layers of polystyrene. In some embodiments, the CNF may be present in an external layer of a polystyrene-CNF composition, for example, only present in the outermost 5, 10, 15, 20, 25, or 50% of a surface of an object made from a composition of the invention. In such embodiments, the core of the object may be substantially lack CNFs or the ac-SF/CNF object may exhibit a concentration gradient of CNFs that is highest at its surface to and lowest at its core.

In some embodiments, other materials, such as hydrophobic or superhydrophobic fillers may also be incorporated. Preferably, the polystyrene component of the composition is prepared from waste or recycled polypropylene and contains air. The polystyrene may be expanded or extruded polystyrene and may be porous or non-porous.

In some embodiments, the composition will exhibit a water contact angle ranging from 60, 65, 70, 75, 80, 85, 90, 95, 100, 110, 115, 120, 125, 130, 135, 140, 145, 150, 160 or >160°, preferably within the range of 140-170°. Typically, a composition that includes the carbon nanofibers will exhibit a substantially greater water contact angle that an otherwise similar composition not containing the carbon nanofibers.

In some embodiments, the composition will have a surface area ranging from 50, 55, 60, 65, 70, 75, 80, 85, 90, 95, 100, 110, 120 or >120 100 $m^2/g$.

The carbon nanofibers present in a polystyrene composition of the invention may have different forms including cylindrical nanostructures with graphene layers arranged as stacked cones, cups or plates. In some embodiments, the carbon nanofibers will be single-walled or multiwalled nanotubes. Mixtures of different kinds of carbon nanofibers may also be incorporated.

Another embodiment of the invention pertains to a method for purifying an aqueous solution that contains a hydrophobic organic substance comprising passing the aqueous solution over or through a surface comprising a polystyrene-CNF composition thereby producing an aqueous product with less of the hydrophobic organic substance, and optionally, passing the aqueous product over or through said surface at least one, two, three or more times or sequentially passing it over two, three, four or more different polystyrene-CNF surfaces. In some embodiments, the polystyrene-CNF surface will form part of a sheet, membrane or filter.

In some embodiments, this method will be practiced using a surface comprising a polystyrene-CNF comprising, consisting essentially of or consisting of polystyrene-CNF made from post-consumer waste polystyrene. In some embodiments, the post-consumer waste polystyrene may be contaminated with between 0.001, 0.002, 0.005, 0.01, 0.02, 0.05, 0.1, 0.2, 0.5, 1, 2 and 5 wt. % (or any intermediate value within this range of sugar, starch, protein, nucleic acid, lipid or other food component; paint, ink or dye; or wood, paper, cellulosic, lignocellulosic, or non-polystyrene plastic contaminant.

In some embodiments, the method is used to treat an aqueous solution contaminated with an oily waste or one or more hydrocarbons or hydrophobic organic compounds. In other embodiments the method treat an aqueous solution that is storm water, effluent from roads or tarmacs, bilge water, water from car washes, and flow back water (FBW) or produced water (PW) derived from petroleum recovery. In some embodiments, the method is used to treat water or another aqueous solution contaminated with about 25, 50, 75, 100, 125, 150, 175, 200, 225, 250, 275, or 300 ppm of the hydrophobic organic substance which is oil or an oily waste or water or an aqueous solution that contains an amount of oil or other hydrophobic contaminant below its saturation point.

Other embodiments of this method may comprise pre-purification of water or another aqueous solution prior to exposure to a polystyrene-CNF surface, for example, by phase separating hydrophobic oils or other organic substances from the water or aqueous solution prior to contacting a separated aqueous phase with the surface of the polystyrene-CNF composition. In other embodiments, the water or aqueous solution is passed over a surface one, two, three, four or more times or sequentially passing it over two, three, four or more different polystyrene-CNF surfaces.

In some embodiments, the composition used in the method will exhibit a water contact angle ranging from 60, 65, 70, 75, 80, 85, 90, 95, 100, 110, 115, 120, 125, 130, 135, 140, 145, 150, 160 or >160°, preferably within the range of 140-170°. Typically, a composition used in the method will contain carbon nanofibers and exhibit a substantially greater water contact angle that an otherwise similar composition not containing the carbon nanofibers. In some embodiments, the composition used in the method will have a surface area ranging from 40, 45, 50, 55, 60, 65, 70, 75, 80, 85, 90, 95, 100, 110, 120 or >120 m$^2$/g.

In some embodiments, water contaminated will oil will be passed over a surface, such as over a sheet, membrane or filter surface comprising a CNF-SF composition of the invention. The temperature at which such contact occurs may range from the freezing point of the contaminated water to its boiling point, for example, from <0, 0, 5, 10, 15, 20, 25, 30, 35, 40, 45, 50, 55, 60, 65, 70, 75, 80, 85, 90, 95, 100 or >100° C. Preferably, contacting will occur at an ambient temperature, such as about 15-30° C. so as to avoid having to cool or heat the treated water. Flow of oil-contaminated water is selected so as to attain a particular degree of oil removal, for example, a flow that reduces ppm of oil below that required for safe drinking water such as those set by the Environmental Protection Agency or by the Food and Drug Administration in the United States.

Another embodiment of the invention is a method of making a polystyrene-CNF composition having a hydrophobic surface comprising: i) mixing a polystyrene with acetone to collapse or soften the polystyrene, ii) removing acetone from the mixture by extracting it with water, iii) drying the collapsed polystyrene, and iv) mixing the collapsed or softened polystyrene with a suspension of carbon nanofibers in acetone or another dispersive solvent to form the composition. In some embodiments of this method a wt. %/wt. % ratio of polystyrene to carbon nanofibers ranges from about 1:2.5, 1:5, 1:10, 1:20, 1:30, 1:40, 1:50 to about 1:100 or any intermediate value within this range.

This method may be practiced using polystyrene that is a post-consumer waste polystyrene, such as a post-consumer waste polystyrene that is contaminated with between 0.001 and 0.1 wt. % of sugar, starch, protein, nucleic acid, lipid or food component; paint, ink or dye; or wood, paper, cellulosic, lignocellulosic, or non-polystyrene plastic contaminant. In some embodiments, this method will further include forming the composition into a sheet, membrane, filter or other object having a surface over which an aqueous solution can flow.

Another embodiment of the invention is directed to a method of making the polystyrene and carbon nanofiber composition disclosed herein. Generally, this method involves treating polystyrene, such as one containing air, with acetone to soften or collapse it and release trapped air. The treated polystyrene is then contacted with CNF under conditions where the CNF impregnate or otherwise associate with the softened or collapsed polystyrene. Acetone is removed to recover an initially pliable SF-CNF composition, which may be formed into a desired shape. In one embodiment, small pieces of Styrofoam® are placed into acetone and sonicated. Once theses acetone-treated pieces attach to each other forming a layer, the layer is removed to a solid substrate, such as glass, to dry. CNF are suspended and sonicated in acetone at a desired concentration and then the dried acetone-treated SF layer is added to the CNF suspension for a time and under conditions sufficient for the CNF to impregnate into the surface of the acetone-treated SF layer. Other ways to disperse carbon nanofibers into polystyrene are described above.

While additional steps may be conducted in some embodiments, preferably, it is not necessary to freeze, heat, pyrolyze, acid-treat, or otherwise chemically modify the polystyrene or carbon fiber ingredients or the resulting composition to make the composition of the invention.

In some embodiments additional ingredients such as resins, such as polyurethanes, fillers, binders, gums, metal fibers or particles, such as gold, platinum or silver nanoparticles, metal oxides, such as $TiO_2$, $ZnO_2$, dyes or pigments may be incorporated. In other embodiments, these are not incorporated. The method may be conducted for a time and under conditions that provide a uniform mixture of polystyrene and carbon nanotubes or a substantially uniform concentration of CNFs on the surface.

In some embodiments, the mixing involves contacting the polystyrene with a suspension of carbon nanofibers in acetone. During mixing a wt. %/wt. % ratio of polystyrene to carbon nanofibers can range ranges from about 1:2.5, 1:5, 1:10, 1:20, 1:30, 1:40, 1:50 to about 1:100 or any intermediate value within this range. This method may further include molding, casting or otherwise shaping an object from the mixture of polystyrene and carbon nanofibers.

EXAMPLES

The following examples illustrate various aspects of the present invention. They are not to be construed to limit the claims in any manner whatsoever.

All the chemical and the reagents were analytical grade and used as is without any further purification. Acetone was acquired from the Merck (Germany) Hexane was purchased from the Sigma-Aldrich (Germany) The distilled water was used throughout the experiment. The lab assembled distillation unit produced and dispensed distilled water.

Instrumentation. MicromeriticsTriStar II Plus instrument was used for finding the BET surface area of the various synthesized hydrophobic materials. The Thermo Scientific Nicolet iS10 instrument was used for the recording of FTIR of the various used materials. For drying purposes, a Blue M Oven was used. A homemade distillation unit was used for the production of distilled water.

Fabrication of CNF impregnated SF. Small pieces of Styrofoam® (SF) were added to acetone which caused them to collapse and release trapped air.

The mixture was sonicated for 10 minutes and during this period pieces of softened SF were observed to attach to each other, forming an intact layer.

After this, the acetone was carefully removed and the acetone-collapsed Styrofoam® (ac-SF) was given time to dry on glass in the open air. The acetone evaporated quickly. Due to its hydrophobic nature, the ac-SF was removed by adding distilled water. The dried ac-SF was easily removed from the glass after drying.

To impregnate the ac-SF with CNFs, the CNFs were first dispersed by sonication into acetone. After that, ac-SF/CNF composite samples having hydrophobic surfaces were prepared by adding the ac-SF was added into the acetone dispersed CNFs to attach the CNFs to the SF. To prepare different composite samples, the amount of SF was kept constant, but different wt %/wt % ratios of CNF were added to different samples. Hydrophobic surface samples having the following ratios were produced: CNF:SF ratio 1:50 (ac-CNF/$SF_{1:50}$), 1:25 (ac-CNF/$SF_{1:25}$), 1:10 (ac-CNF/$SF_{1:10}$), and 1:5 (ac-CNF/$SF_{1:5}$).

The resulting composites of SF and CNF were initially highly flexible and could attain any shape.

Morphological characterization of ac-CNF/SF. The interaction between CNF and the Styrofoam® was observed to occur spontaneously. CNF attachment occurred as soon as the Styrofoam® pieces were added. While not being bound to any particular theory or explanation, the inventors consider that this spontaneous interaction between CNF and the Styrofoam® may be attributed to the hydrophobic nature of these ingredients and a $\pi$-$\pi$ interaction.

The composite of CNF/SF was found to be pliable and could be molded into a variety of forms due to its soft nature. However, after drying, it became inflexible and its morphology was difficult to change.

The control of morphology is another advantage that can be useful to form a variety of different shapes for hydrophobic uses. The various composites of CNF/SF were fabricated by keeping the Styrofoam® amount constant and varying the amount of CNF amount to determine the effects of different concentrations of on producing a highly hydrophobic surface.

The morphology of the SF composition without and with impregnation with various CNFs was first observed with a normal camera and a detailed view was observed with a scanning electron microscope. A marble-like compact layer of the ac-SF can be seen in FIG. 1A and no porosity can be visualized in the low-resolution image.

An amount of Styrofoam® (1,000 mg) was impregnated with 20, 40, 100 and 200 mg of CNF to respectively product the ac-SF/$CNF_{1-5}$ (20 wt % CNF); the ac-SF/$CNF_{1-10}$ (10 wt. % CNF); the ac-SF/$CNF_{1-25}$ (4 wt. % CNF); the ac-SF/$CNF_{1-50}$ (2 wt. % CNF). As evidenced from the color change from marble white to dark black, the CNFs were substantially impregnated into the SF.

After impregnation, the compactness of the SF-CNF composition and its surface morphology changed and many pores were seen, compare FIG. 1A (no CNFs) to FIGS. 1B, 1C and 1D 20, 40 and 100 mg of CNF.

Figure 2A:
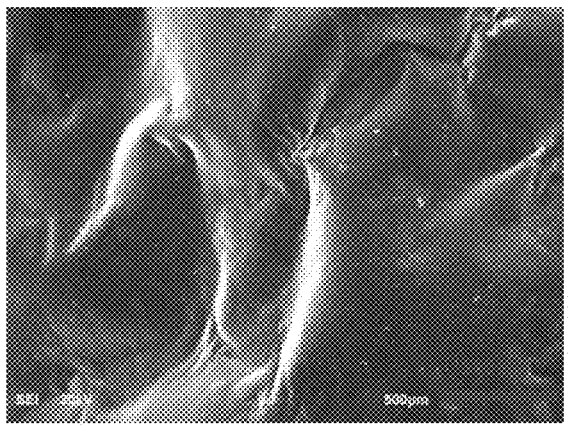
FIGS. 2F-2J. SEM images at a higher magnification (5 μm) of the hydrophobic composite (a) ac-SF, (b) ac-CNF/$SF_{1:50}$, (c) ac-CNF/$SF_{1:25}$, (d) ac-CNF/$SF_{1:10}$, (e) ac-CNF/$SF_{1:5}$.
Figure 2B:
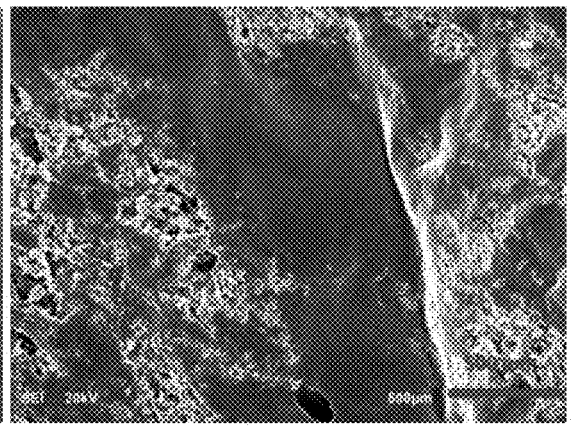
Figure 2C:
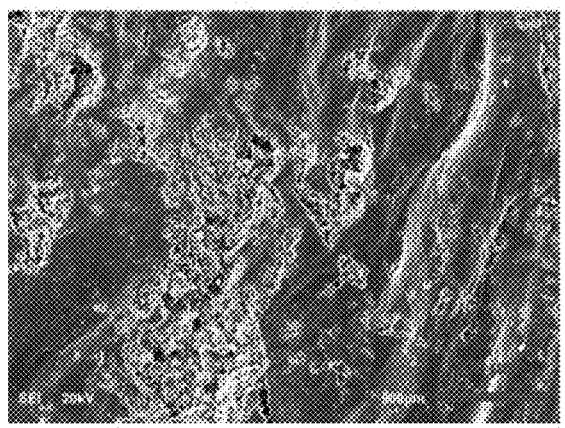
Figure 2D:
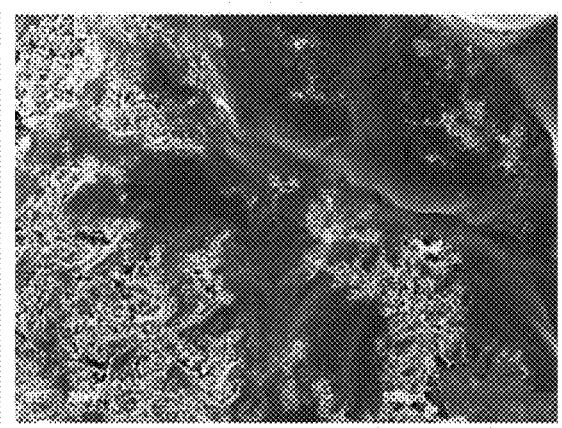
Figure 2E:
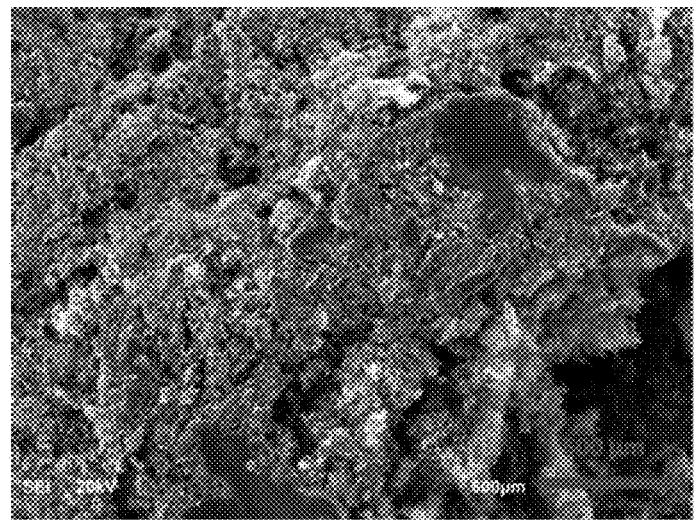
Figure 2F:
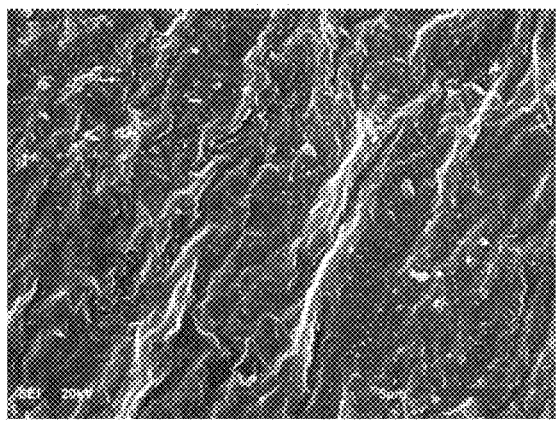

The detailed morphology was further investigated with the SEM to observe how the CNF and ac-SF were interacting with each other. The same surface compactness of the ac-SF was observed with SEM. The high-resolution image is showing some sort of waves on the surface which is generated during the settling of the surface (FIG. 2A, FIG. 2F).

The amount of Styrofoam® for all hydrophobic nanocomposite syntheses was 1,000 mg while different amounts of the CNF were used. The ac-CNF/$SF_{1:50}$, ac-CNF/$SF_{1:25}$ composites contained a lower amount of CNF (respectively, 2 wt % and 4 wt %). The surface morphology demonstrated that CNF uniformly distributes inside the surface, however, few randomly distributed open face patches can be observed on the surface. These patches are significantly increased as the amount of the CNF increased. For example, in ac-CNF/$SF_{1:10}$, these patches covered more area.

Figure 2G:
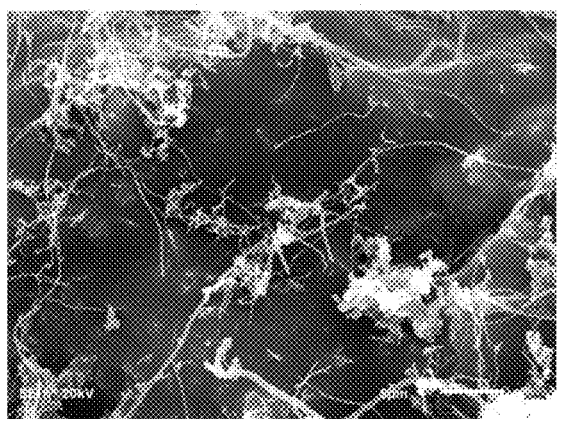
Figure 2H:
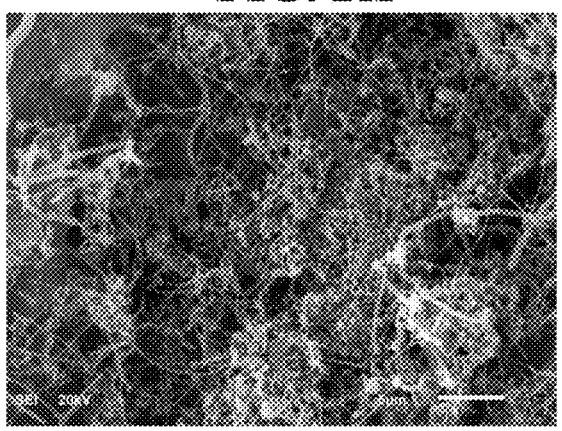
Figure 2I:
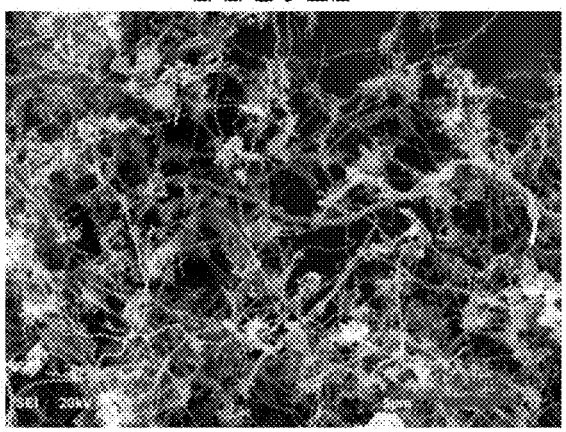
Figure 2J:
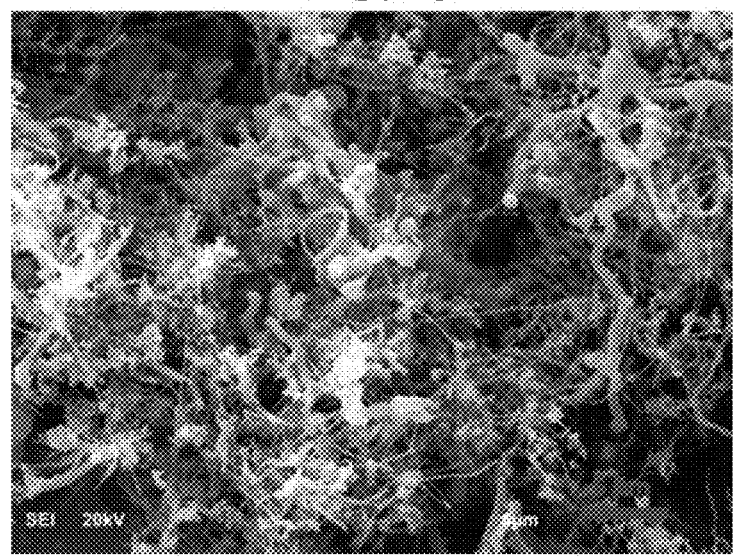

In high magnification, a surface of extruded and entangled CNF can be seen by SEM; see the image of ac-CNF/$SF_{1:10}$ in FIG. 2I. However, in ac-CNF/$SF_{1:5}$ (FIG. 2J) the surface behavior is entirely changed and no compact sheet-like layer was observed on the surface which was present on the surface of the other ac-CNF/$SF_{1:50}$ (FIG. 2G), ac-CNF/$SF_{1:25}$ (FIG. 2H), and ac-CNF/$SF_{1:10}$ (FIG. 2J) composites. The disappearance of the compact layer provided more chances to absorb the oil compared to a compact layer where less porosity is present. Moreover, it is clearly seen in the highly magnified image of ac-CNF/$SF_{1:10}$ in FIG. 2I that CNF surface was covered by the ac-SF.

Overall, the morphological study revealed that ac-CNF/$SF_{1:10}$ (FIG. 2I) was highly porous and SF was distributed on its surface in contrast to ac-CNF/SF composites containing lower amounts of CNF. However, this further increment caused severe brittleness and the CNF were unable to attach in a continuous and uniform way with ac-SF and to each other to attain any shape.

Evaluation of the surface hydrophobicity. The surface hydrophobicity and the oleophilicity were evaluated using water and oil. The surfaces of the various composites displayed different behavior towards water droplets while the hexane drops were spontaneously spread on the all synthesized composites. The spontaneous spread of the hexane revealed that surface was oleophilic.

The hydrophobicity of the surface of each composite was examined by measuring the water contact angle (CA) with the surface of the composite. The exact measurement of the contact angle is difficult due to the roughness of the surface due to this reason the approximate angles are mentioned.

Figure 3A:
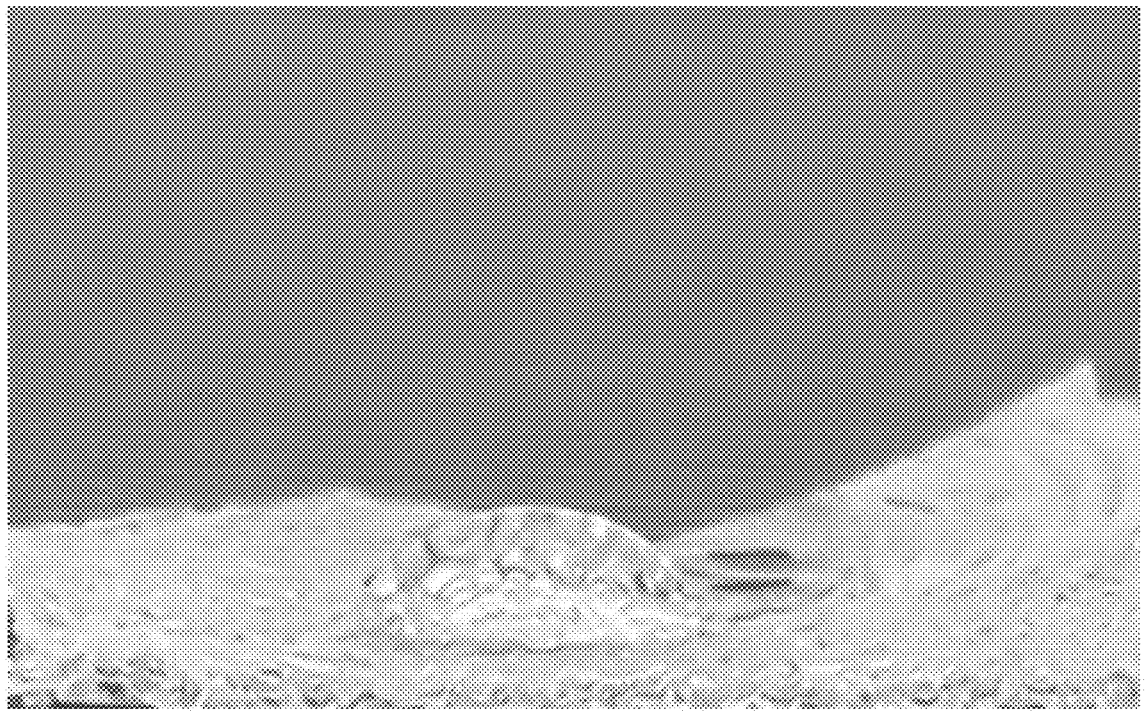
FIGS. 3A-3J. The contact angle of water on the nanocomposite surfaces
Figure 3B:
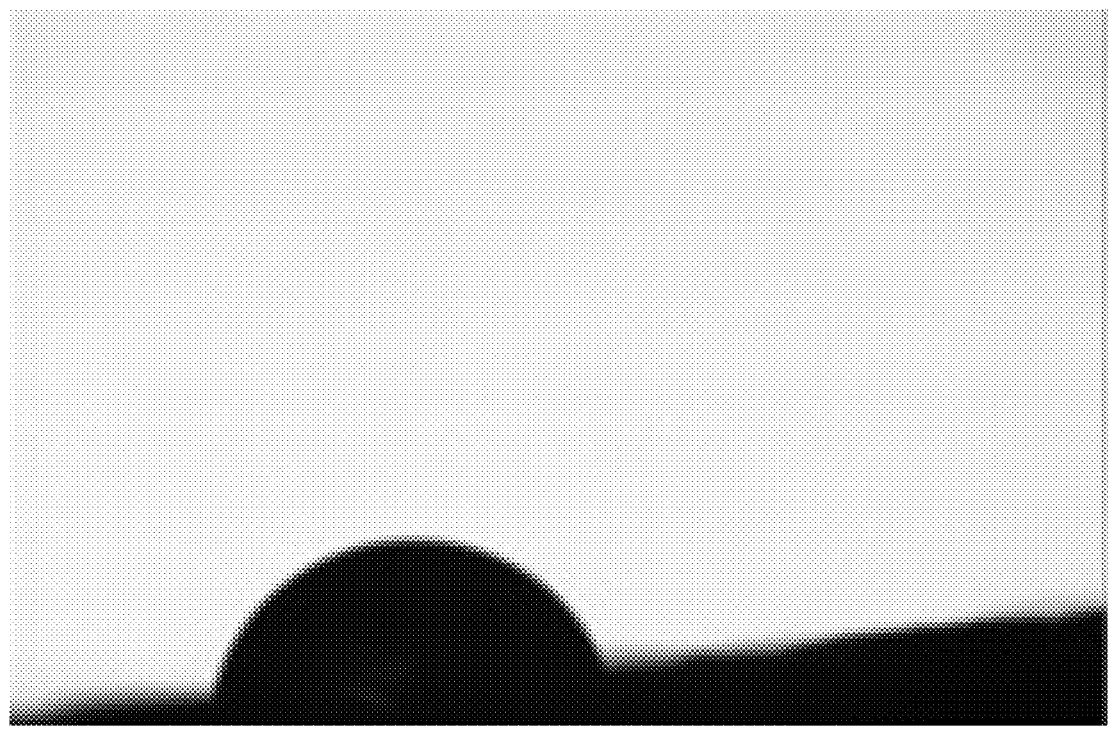
Figure 3C:
Figure 3D:
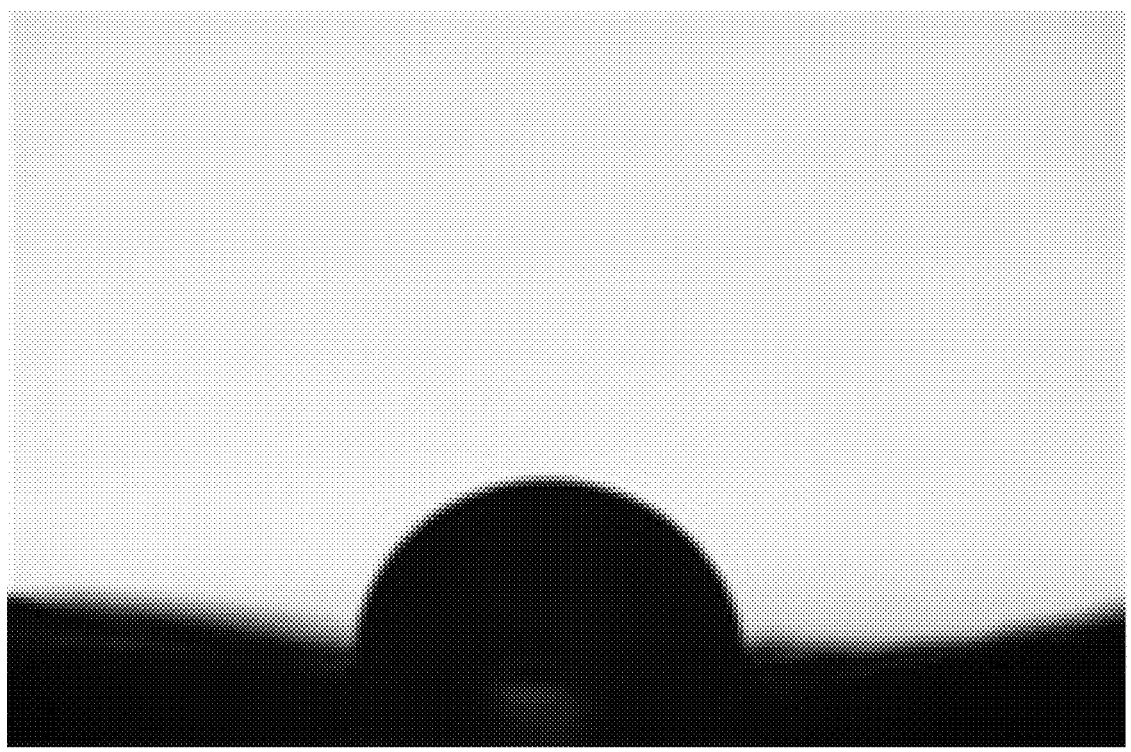
Figure 3E:
Figure 3F:
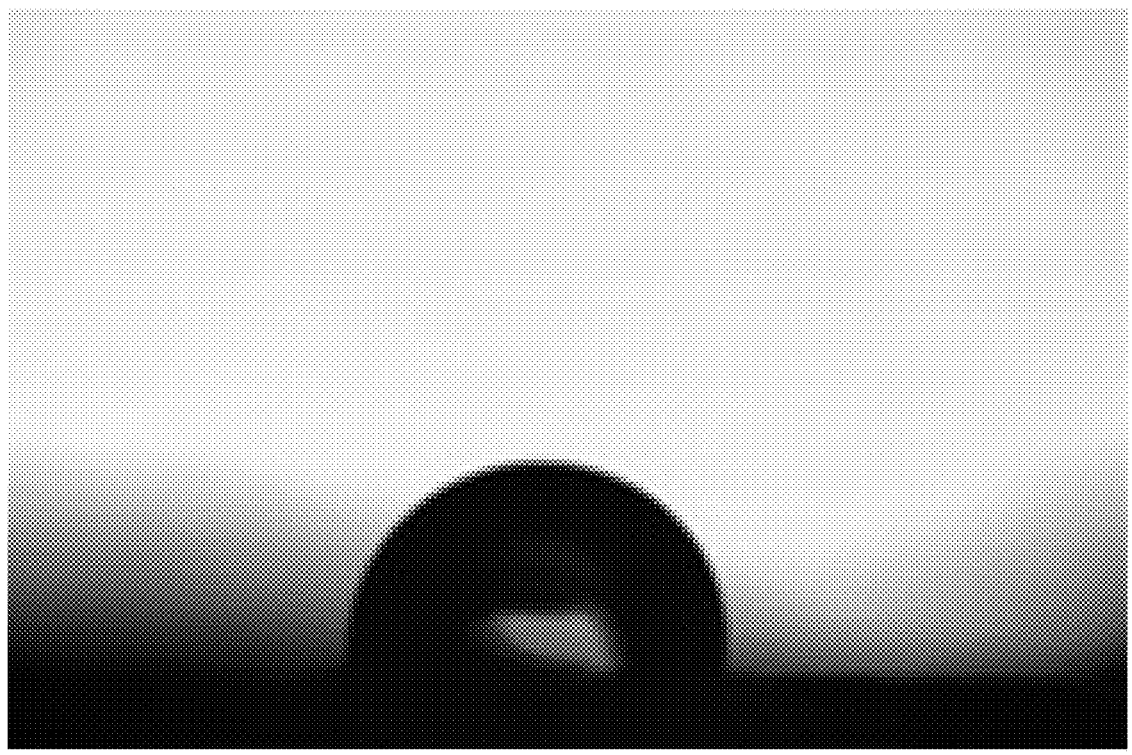
Figure 3G:
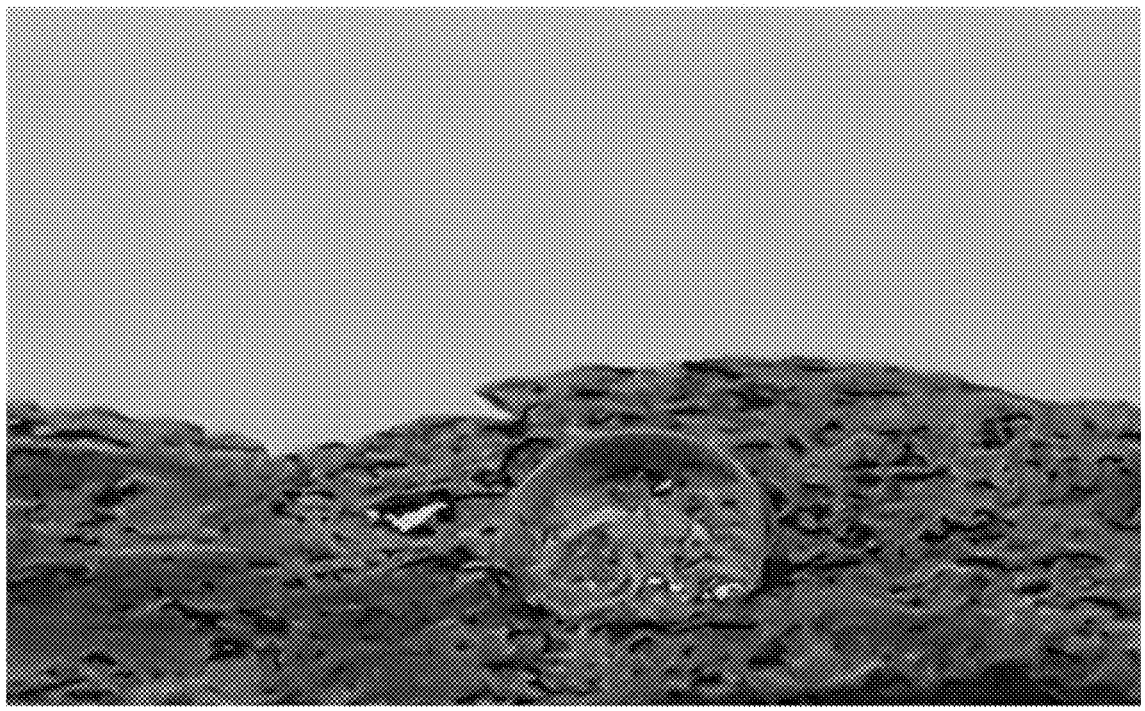
Figure 3H:
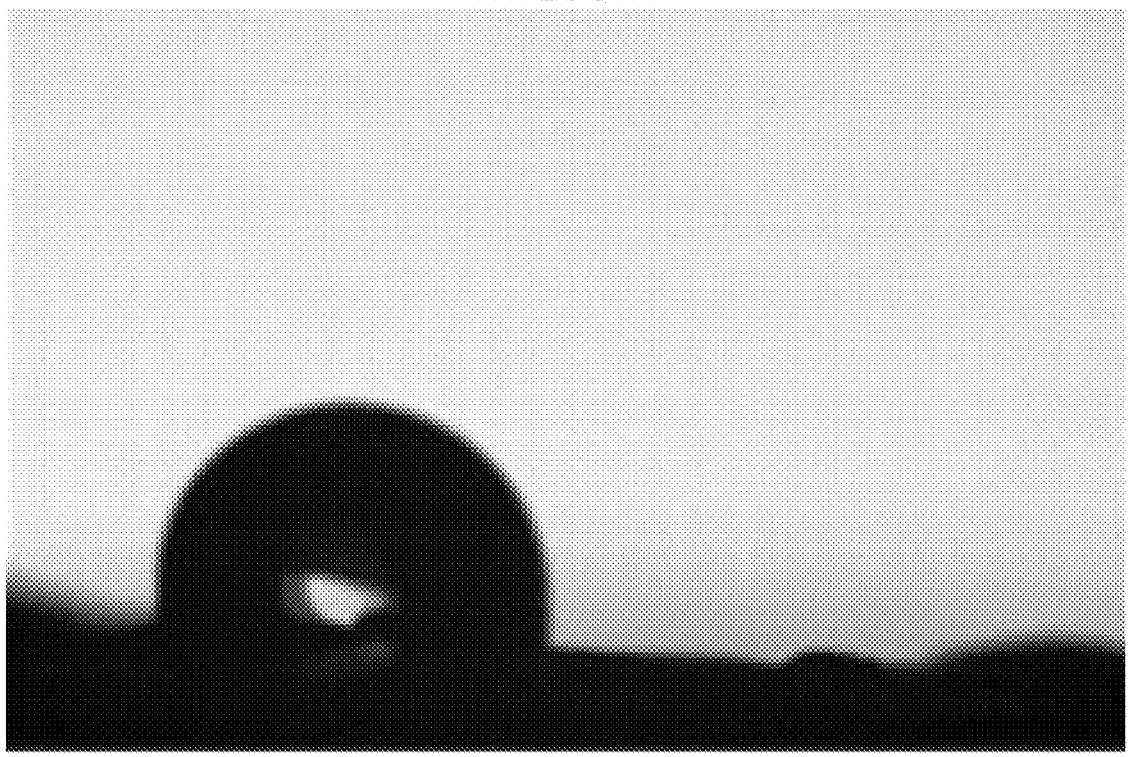
Figure 3I:
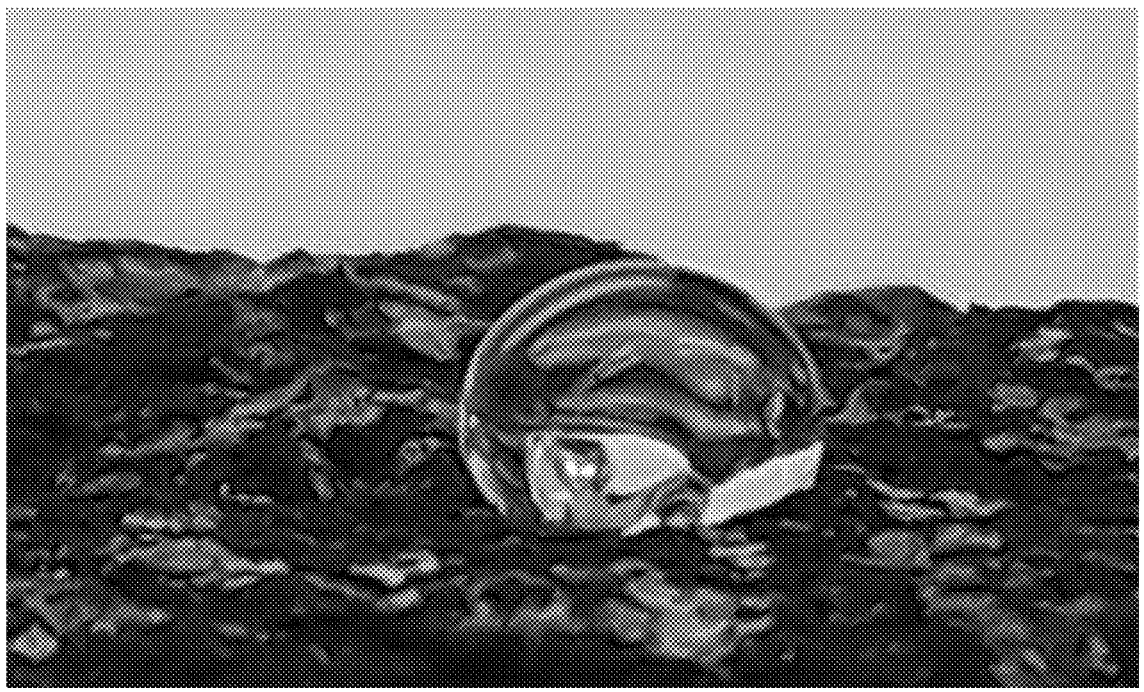
Figure 3J:
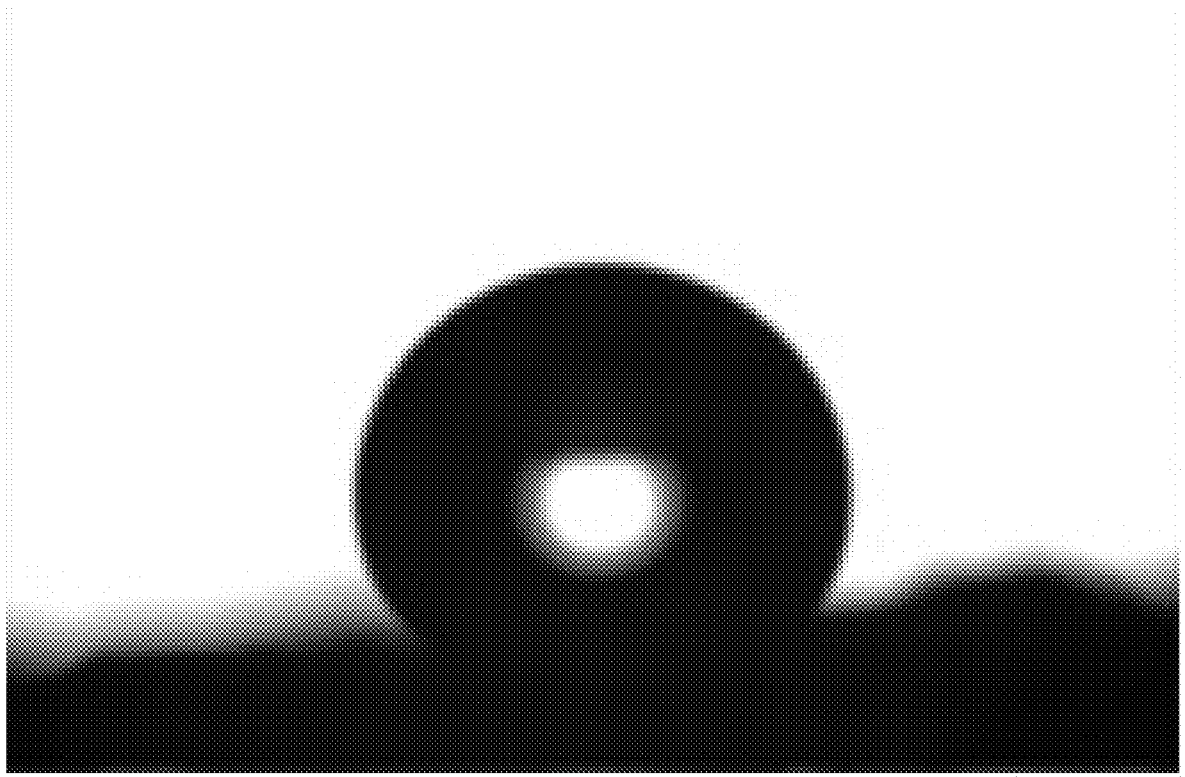

The hydrophobicity of ac-SF (no CNFs) was low and its contact angle was found to be about 74.29°±0.18° (FIG. 3A-3B). However, a significant improvement in the contact angle was observed when CNFs were impregnated into the ac-SF and positively correlated with amount of CNFs incorporated. For example, a comparison of the water contact angles for ac-CNF/$SF_{1:50}$ and ac-CNF/$SF_{1:5}$ show an increase from 74.29°±0.18° to 154.39°±2.35° that correlates with CNF content. While not being bound to any theory, a huge increment in the contact angle of the ac-CNF/$SF_{1:5}$ may be due to the synergistic effect of ac-SF and CNF which was so apparent in other composites having compact surfaces with little CNF exposure.

In case of ac-CNF/$SF_{1:5}$ the growth of the ac-SF can be observed on the CNF in the SEM images and made a continuous porous network. The porous network and high CNF content with ac-CNF impart the ultrahigh hydrophobic and oleophilic character to the surface.

The fabricated hydrophobic materials were further investigated using Fourier-transform infrared spectroscopy (FTIR). Polystyrenes like Styrofoam® are characterized by the presence of certain absorption band and spectra; A.

Imhof, Preparation and Characterization of Titania-Coated Polystyrene Spheres and Hollow Titania Shells, Langmuir. 17 (2001) 3579-3585. doi:10.1021/la001604j, incorporated herein by reference in its entirety. These were observed for the ac-SF of the invention.

Figure 4:
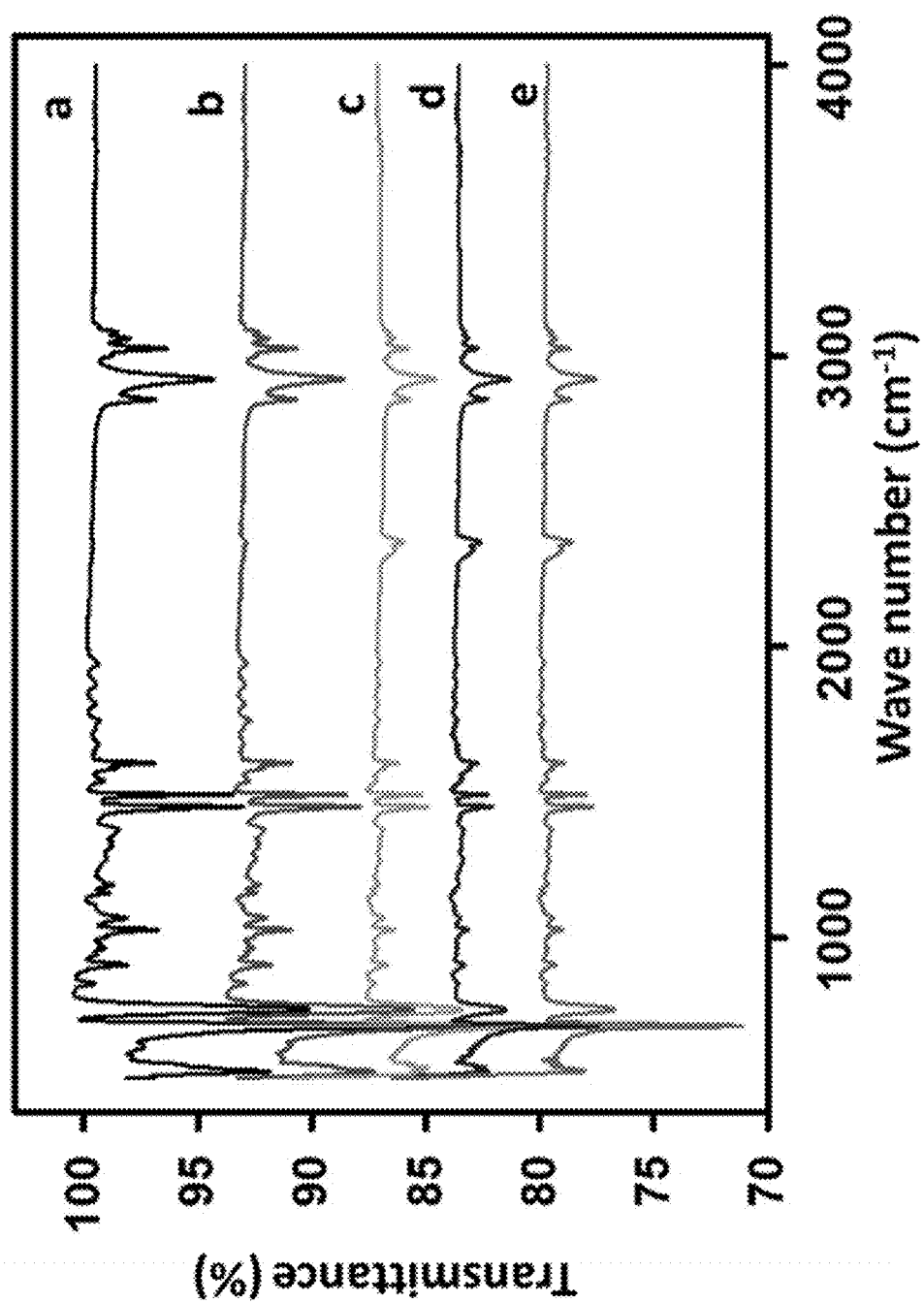
FIG. 4. FTIR spectra of (a) ac-SF, (b) CNF/$SF_{1:50}$, (c) CNF/$SF_{1:25}$, (d) CNF/$SF_{1:10}$, and (e) CNF/$SF_{1:5}$.

A strong absorption peak appeared at 695 cm$^{-1}$ which is a band characteristic of the aromatic C—C out-of-plane bend. This band appeared in all fabricated hydrophobic materials as shown in FIG. 4. However, it was slightly shifted from 695 to 696 cm$^{-1}$ in ac-CNF/SF$_{1:5}$ as shown in FIG. 4e. The C—H out-of-plane bend in ac-CNF was observed at 751 cm$^{-1}$ which was shifted to 753 cm$^{-1}$ in ac-CNF/SF$_{1:5}$. Characteristic aromatic overtone bands were observed in the range of 1700 to 2000 cm$^{-1}$ in all synthesized hydrophobic composites and the C—C aromatic stretch was observed around 1490 cm$^{-1}$. The impregnation of polystyrene with CNF produced some drastic changes in the IR spectra of ac-SF as seen in FIG. 4. The intensity of the peaks was significantly decreased and moreover, some change in the peak shift was also observed. These FTIR results show that CNF was successfully impregnated into the ac-SF.

Figure 5:
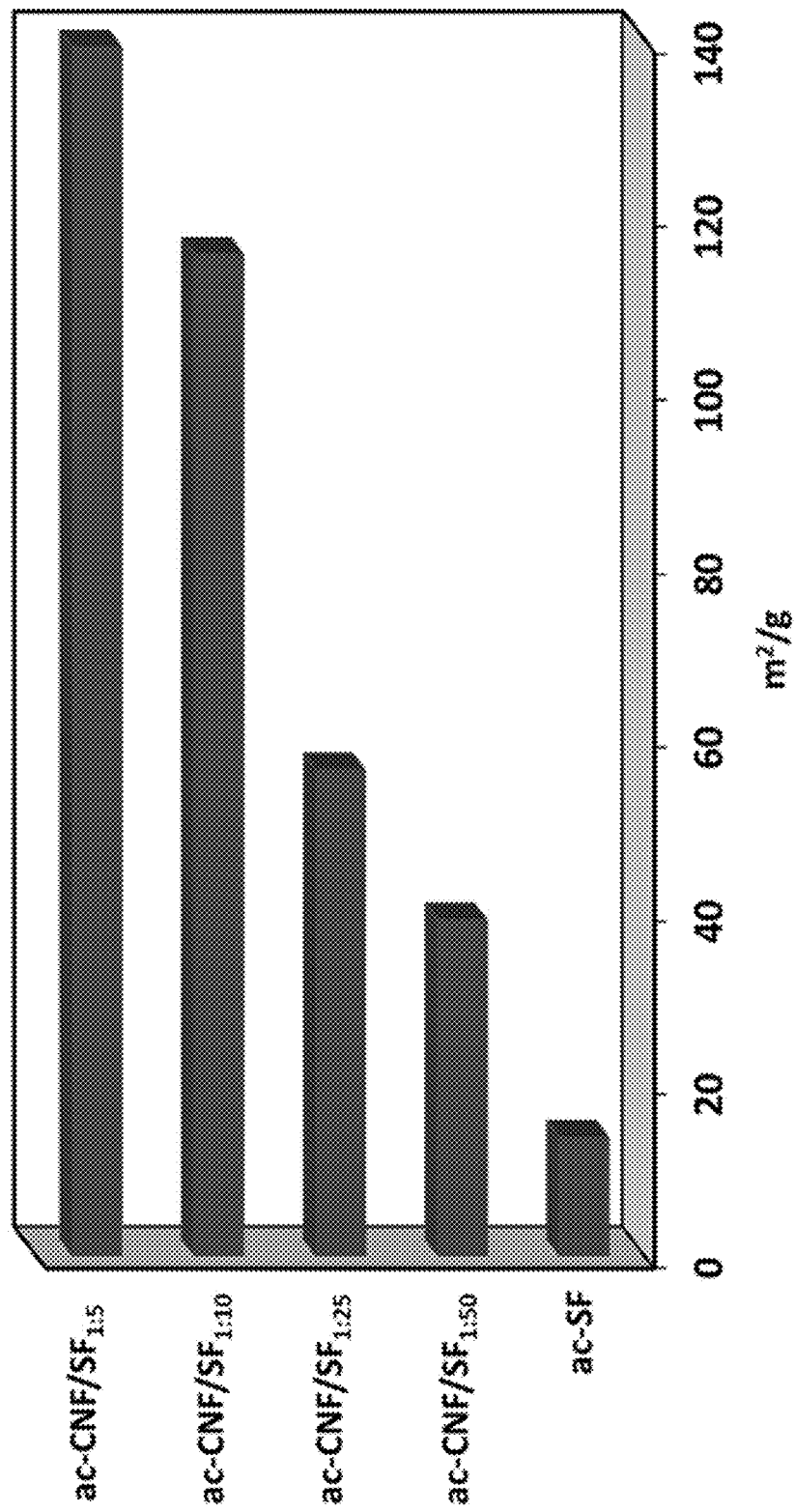
FIG. 5. BET surface area study of the ac-SF, ac-CNF/$SF_{1:50}$, ac-CNF/$SF_{1:25}$, ac-CNF/$SF_{1:10}$ and ac-CNF/$SF_{1:5}$
FIG. 6A. 2 mL of Hexane and methylene blue colored water added into different glass vials.

The surface area of the ac-SF, ac-CNF/SF$_{1:50}$, ac-CNF/SF$_{1:25}$, ac-CNF/SF$_{1:10}$ and the ac-CNF/SF$_{1:5}$ were investigated by nitrogen adsorption and desorption isotherm. The BET values showed significant changes in the surface area of the material after grafting with the carbon nanofiber. The ac-SF showed an extremely low surface area of 14 cm$^2$ due to the compactness of the surface. However, CNF impregnation substantially improved the electroactive surface area. The electroactive surface area continuously improved from ac-SF (no CNFs) to ac-CNF/SF1:5 being enhanced from 14 to 139 cm$^2$ (FIG. 5). This huge increment in the surface area showed that CNF impregnation not only improved the hydrophobicity, it also provided a huge surface area for the efficient oil removal of oil.

Figure 6A:
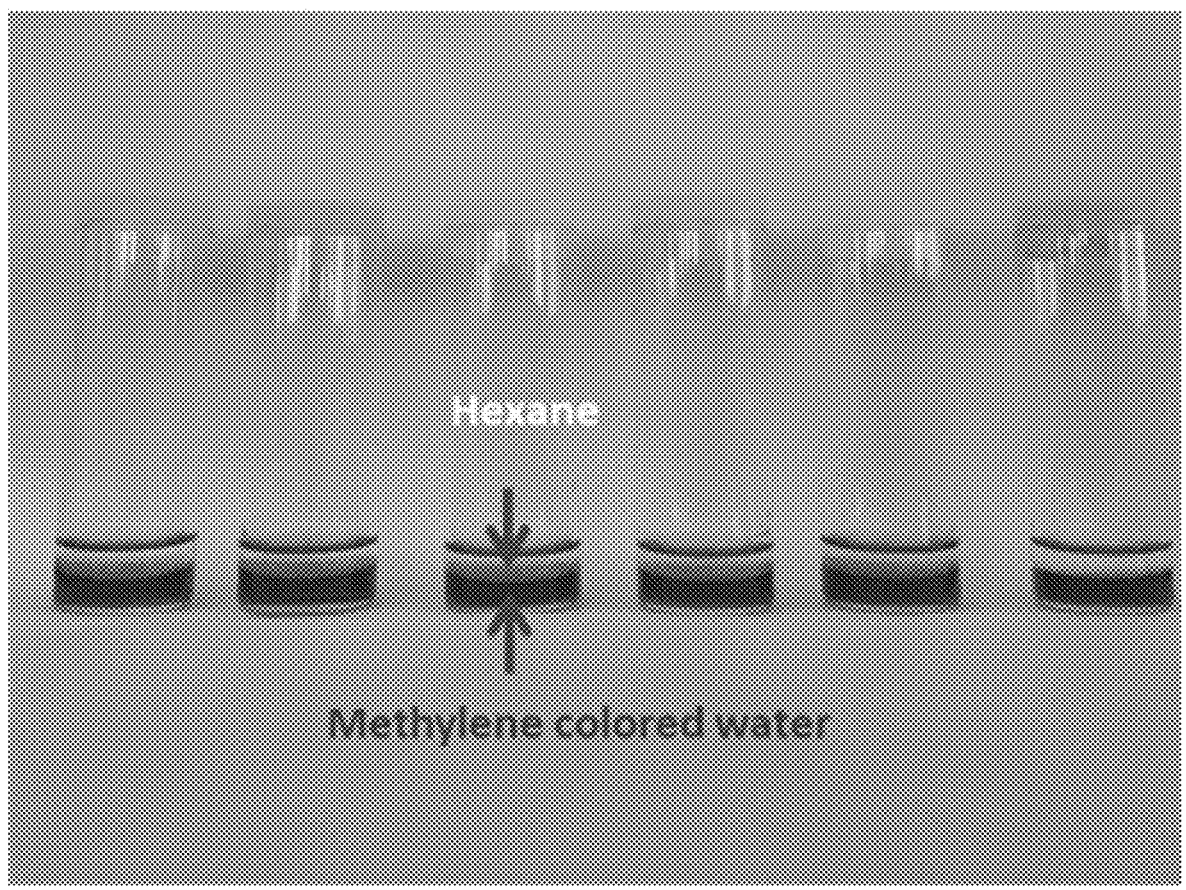
FIG. 6B. Polypropylene filled with various synthesized hydrophobic composites for separation of Hexane.
FIG. 6C. Comparison of the oil taking capability of the empty PP with ac-CNF/SF$_{1:5}$.
FIG. 6D. Hexane separated by ac-CNF/SF$_{1:5}$.
Figure 6B:
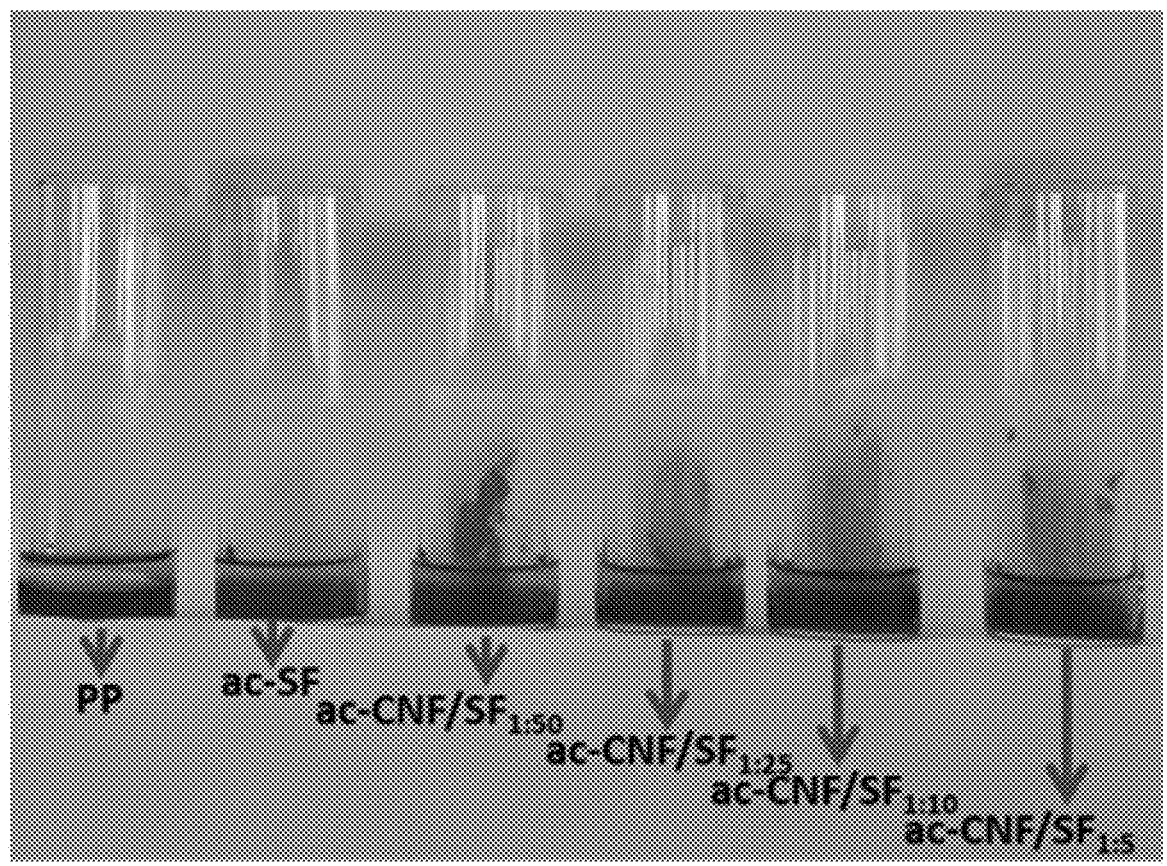

Separation of oil from water. The oil separation capability was determined for the fabricated hydrophobic nanocomposites using a mixture of hexane and the water. Equal volumes of hexane (2 mL) and methylene blue colored water (2 mL) were added to different glass vials. Due to its low density, hexane formed an upper layer while methylene blue color water formed the lower layer (FIG. 6A). To make the nanocomposite separation easy and reusable, the different tested hydrophobic materials were enclosed in conventional polypropylene bags.

Samples of ac-CNF, ac-CNF/SF$_{1:50}$, ac-CNF/SF$_{1:25}$, ac-CNF/SF$_{1:10}$, ac-CNF/SF$_{1:5}$ and empty PP were transferred into vials containing the mixture of the hexane and the water. A change in the volume of the hexane with the hydrophobic material was observed after the first five or ten minutes. Later on no change was observed which indicated that the material had become saturated with hexane. However, all the tested materials behaved differently towards hexane.

Figure 6C:
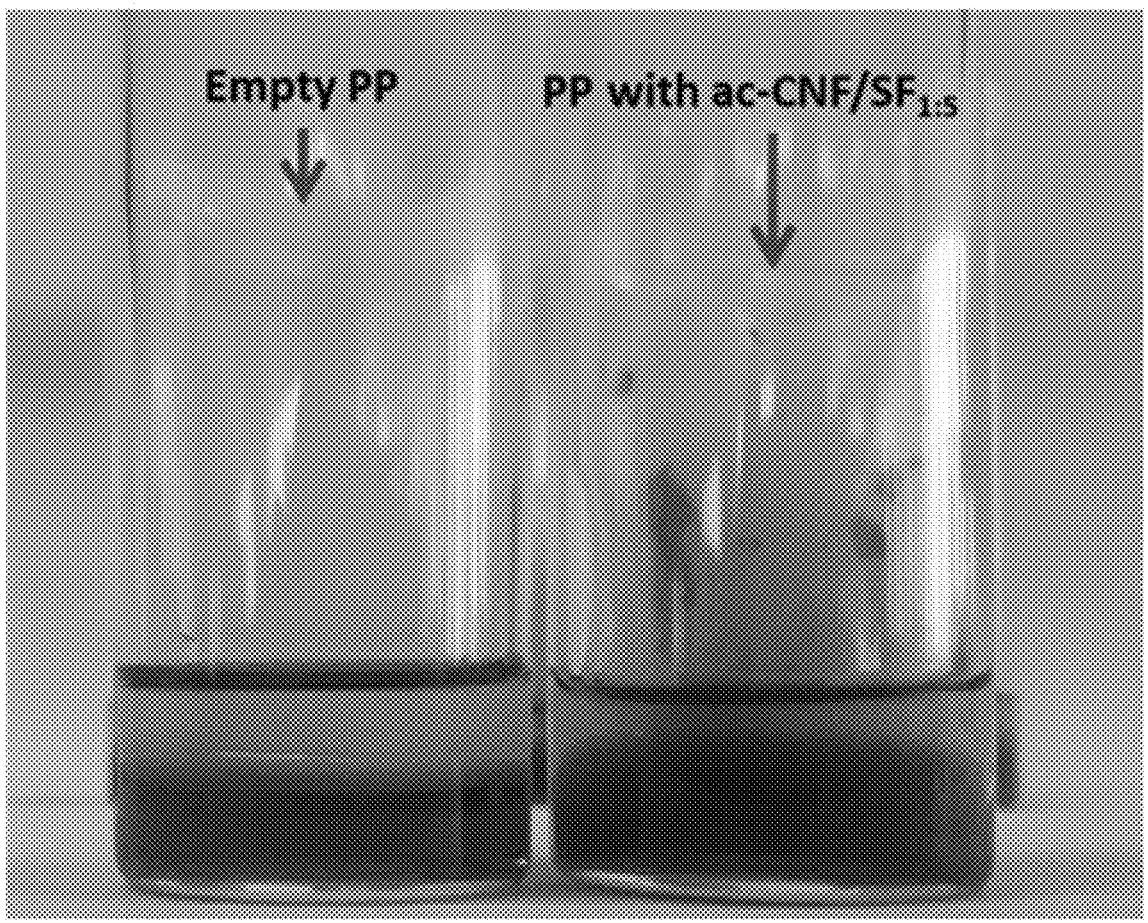

The ac-SF without CNF exhibited a minimum capability to take up hexane. However, the ability to take up hexane increased with the increasing amount of the CNFs. The empty PP showed no change in the volume of the hexane and water (FIG. 6C).

Figure 6D:
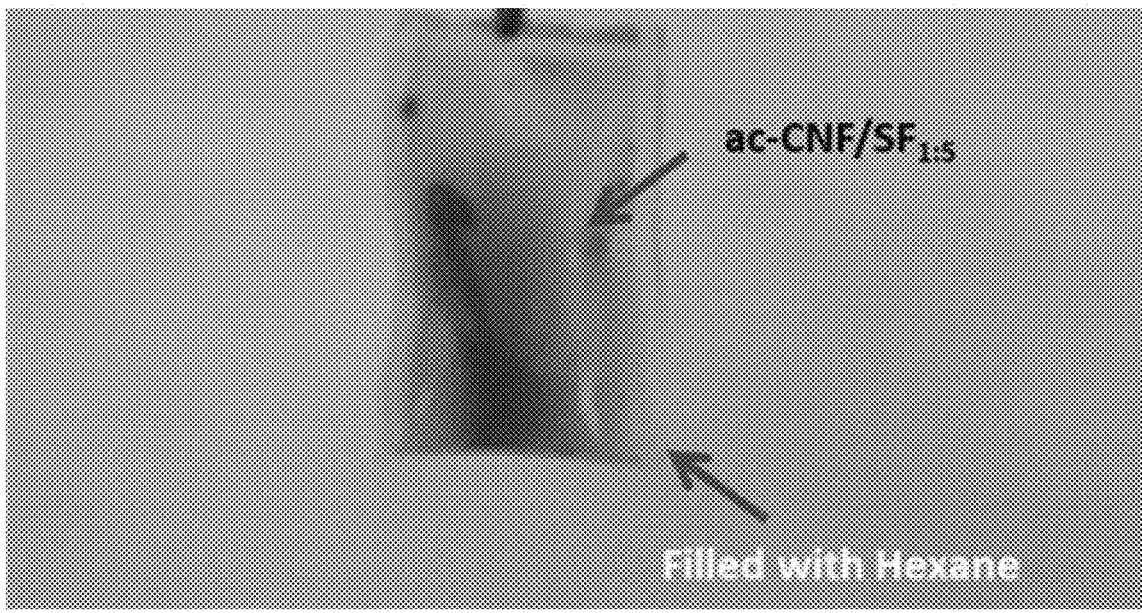

The separation capabilities of the ac-CNF/SF1:10 and the ac-CNF/SF1:5 were close, but the ac-CNF/SF1:5 took up slightly more hexane compared ac-CNF/SF1:10. For this reason, the ac-CNF/SF1:5 was selected as the best material for the separation of oil from water. Moreover, the ac-CNF/SF1:5 also had a high contact angle and displayed more hydrophobic characteristics. After some time, the ac-CNF/SF1:5 was removed from the mixture of hexane and water. FIG. 6D shows hexane inside and that it has not taken up any water (FIG. 6D).

Figure 7A:
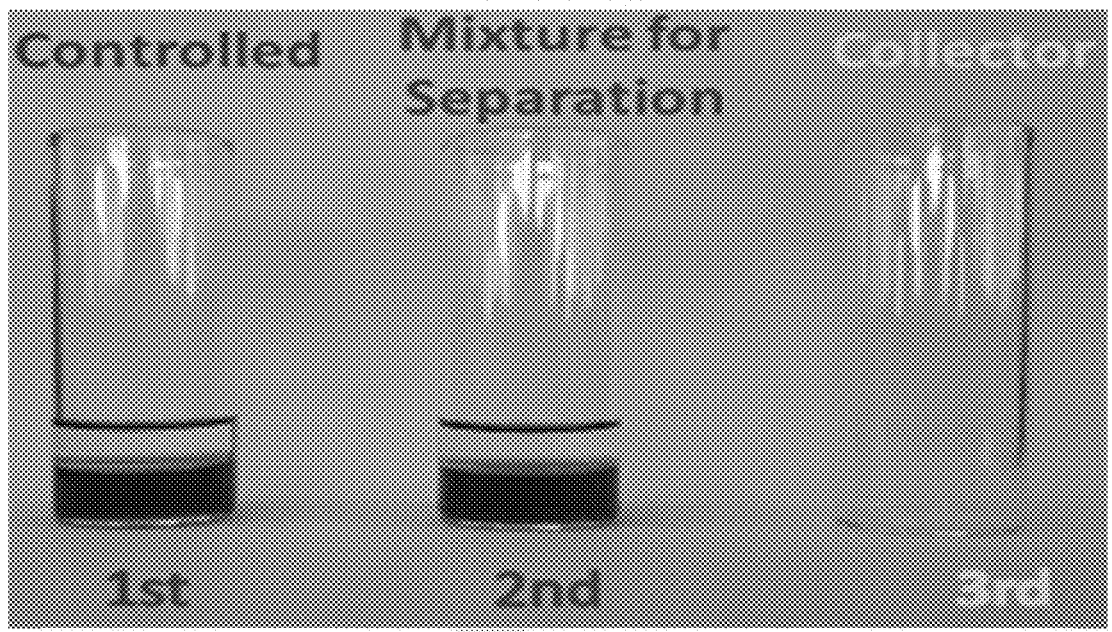
FIG. 7A to 7E. Flowchart demonstrating the complete separation of hexane form the mixture of hexane and water using ac-CNF/SF$_{1:5}$.
Figure 7B:
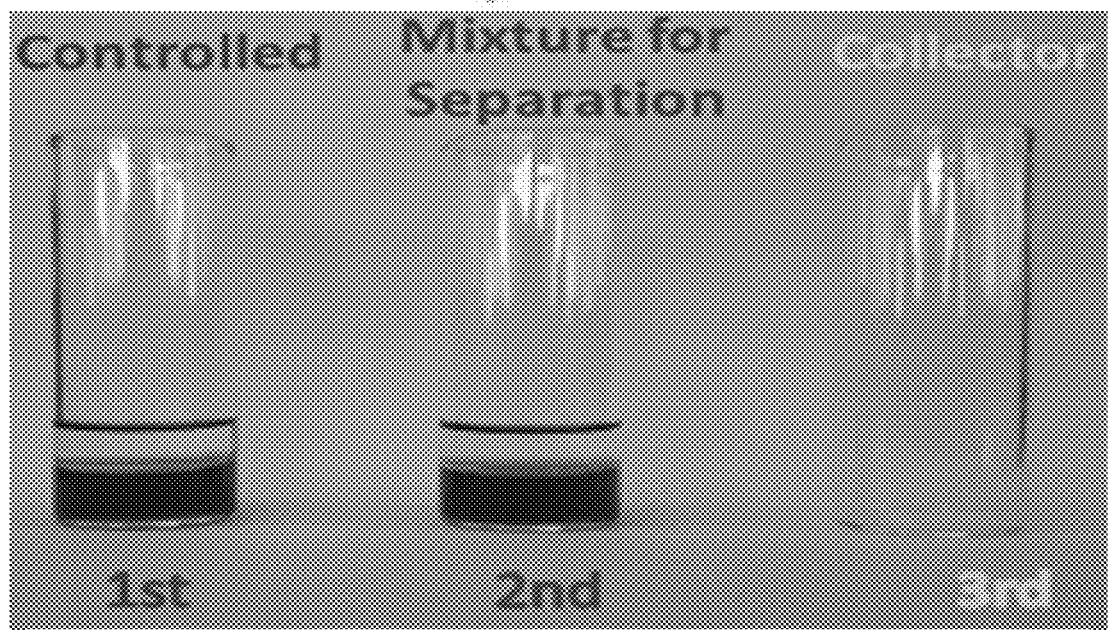
Figure 7C:
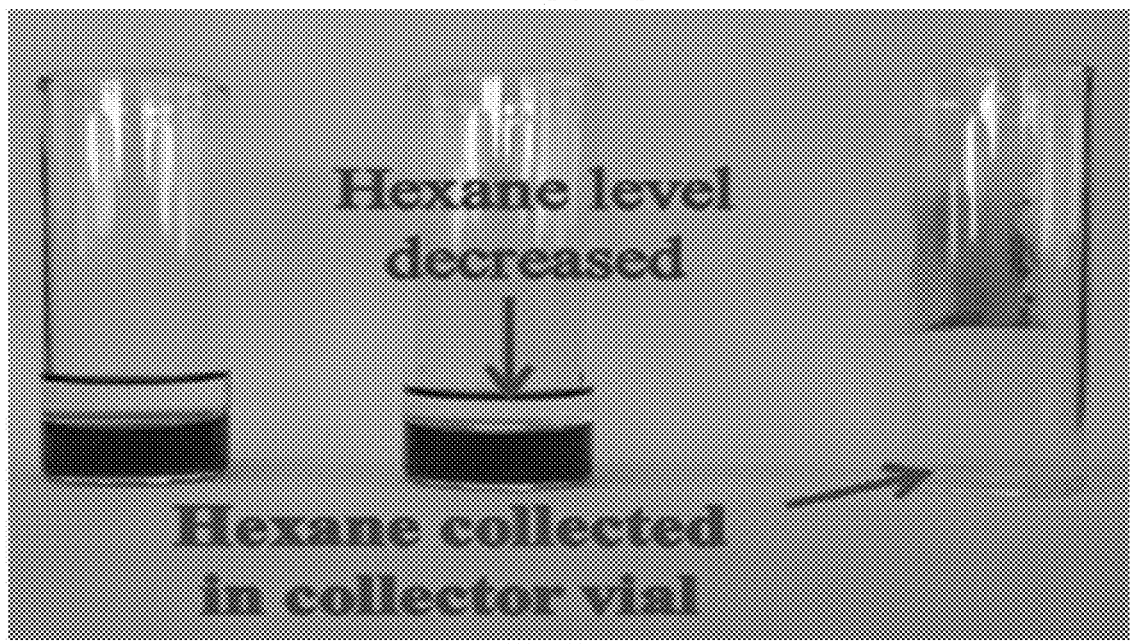
Figure 7D:
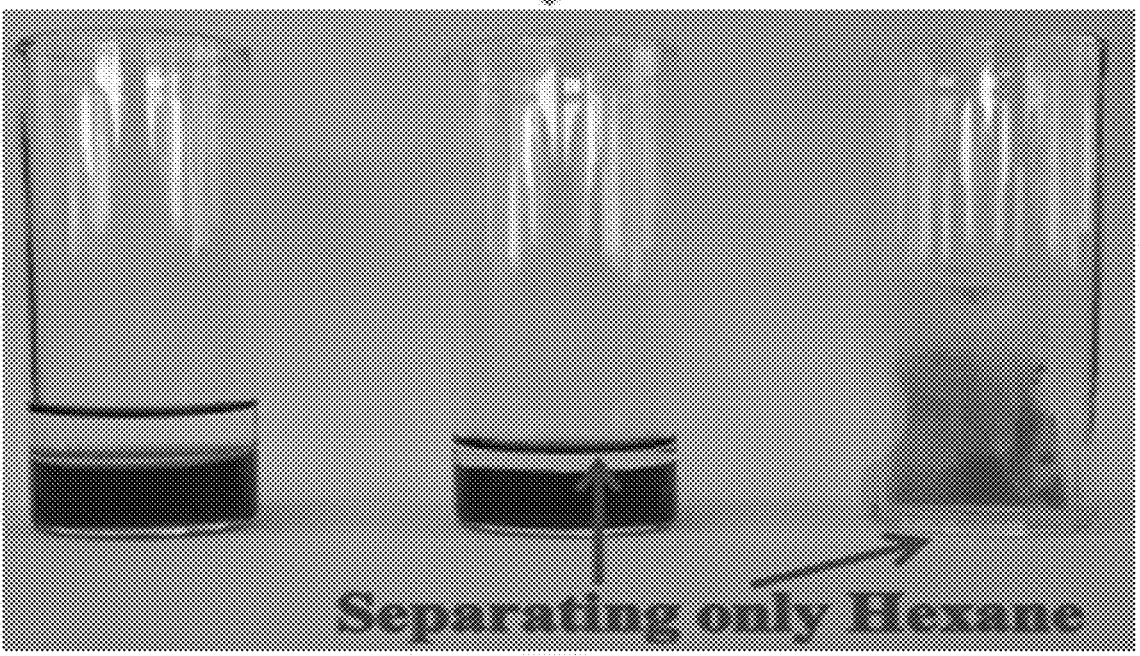
Figure 7E:
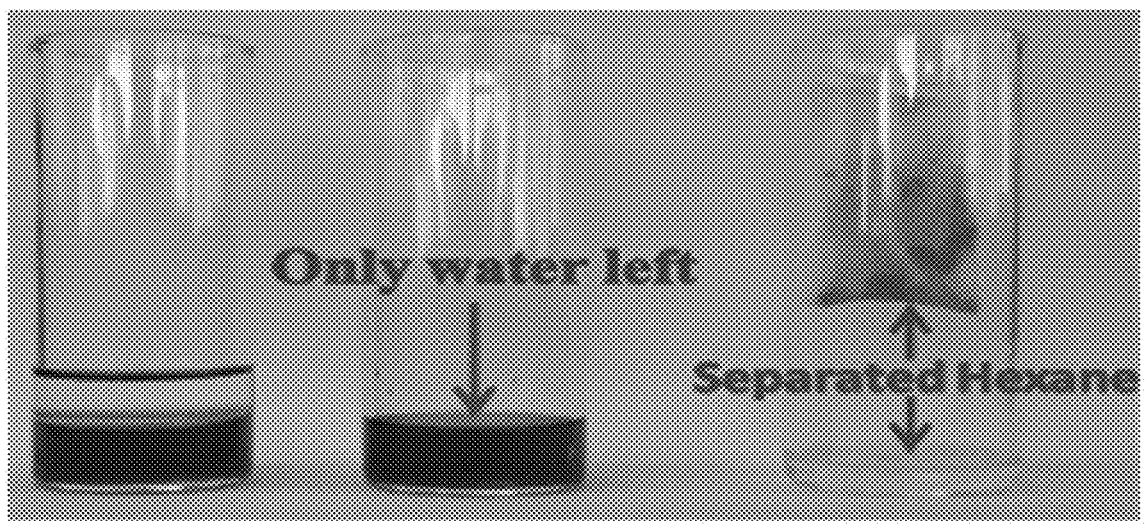

The ac-CNF/SF$_{1:5}$ was also investigated for the complete separation of oil and water. For this purpose, three vials are prepared. A first vial was a control vial containing a water (4 mL) and hexane (4 mL) mixture. In the second vial, the same volume of water and hexane was added and this vial was dedicated to the separation experiment. The third vial was empty and used as a collector to collect the separated component (hexane) (FIG. 7A). The ac-CNF/SF1:5 was dipped into the mixture of the hexane and the water in the $2^{nd}$ glass vial for 5 minutes to give time for the saturation of the mixture. The high hydrophobicity of the material allowed the fast separation of hexane and within five minutes the surface was saturated with the hexane. After that, the separated hexane was released into the collector vial. The process was repeated until the hexane was completely separated from the methylene blue colored water. However, the recovery in the collector vial looks a little bit lower compared to the controller vial which was due to the volatile nature of the hexane. The ac-CNF/SF 1:5 provided a high surface area for the evaporation and some quantity still contained by the material (FIG. 7E). This study demonstrated that CNF impregnated ac-SF is an excellent and cost-effective material for the efficient separation of oil and water.

As shown herein, the inventors have developed a facile method to attain an extremely low-cost hydrophobic material from Styrofoam® waste. The hydrophobic material can be produced in the bulk for oil and water separation and this methodology reduce the environmental waste. The acetone-collapsed Styrofoam® was impregnated with carbon nanofibers. The synergistic effect of the SF and the CNF provided an ultrahydrophobic surface. The CNF impregnation has also displayed a great impact on the surface area. The alone ac-SF has shown poor hydrophobicity and the contact angle was substantially improved after CNF impregnation into ac-CNF. The ac-CNF/SF$_{1:5}$ have shown efficient capability for the effective separation of hexane and oil mixture. This methodology is not only introduced attractive low-cost hydrophobic material; it also encourages working with waste material for the fabrication of the useful product. This approach will help to reduce chemical waste from the environment.

Terminology. Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for purifying an aqueous solution, the method comprising:
passing the aqueous solution, comprising a hydrophobic organic substance, over or through a surface comprising a polystyrene-carbon nanofiber (CNF) composition, thereby producing an aqueous product comprising less of the hydrophobic organic substance,
wherein a polystyrene of the polystyrene-CNF comprises post-consumer waste collapsed polystyrene foam,
wherein a CNF of the polystyrene-CNF is associated with the polystyrene by sonicating a mixture of the CNF and the polystyrene in softened or collapsed form,
wherein the post-consumer waste polystyrene is contaminated with sugar, starch, protein, nucleic acid, lipid, other food component, paint, ink, dye paper, or non-polystyrene plastic contaminant, in a range of from 0.001 and 5 wt. %.

2. The method of claim 1, wherein the aqueous solution comprises oil or a further hydrocarbon.

3. The method of claim 1, wherein the polystyrene-CNF composition is in the form of a membrane or a filter having a surface exposed to the aqueous solution.

4. The method of claim 1, further comprising:
producing the polystyrene-CNF from the post-consumer waste collapsed polystyrene foam.

5. The method of claim 1, further comprising:
producing the polystyrene-CNF from the post-consumer waste collapsed polystyrene foam,
wherein the post-consumer waste collapsed polystyrene foam is contaminated with the sugar, starch, protein, nucleic acid, lipid, other food component, paint, ink, dye paper, or non-polystyrene plastic contaminant, in a range of from 0.001 and 0.1 wt. %.

6. The method of claim 1, wherein the aqueous solution is water comprising the hydrophobic organic substance in a range of from 50 to 250 ppm,
wherein the hydrophobic organic substance is oil or an oily waste.

7. The method of claim 1, further comprising:
phase separating one or more hydrophobic oils or other organic substances from the aqueous solution, to obtain a separated aqueous phase, prior to contacting, then contacting the separated aqueous phase of the aqueous solution with the surface of the polystyrene-CNF composition.

8. The method of claim 1, further comprising:
passing the aqueous product over or through the surface at least one more time.

9. The method of claim 1, wherein the surface of the composition has a water contact angle in a range of from 80 to 160°.

10. The method of claim 1, wherein the surface of the composition has a surface area in a range of from 50 to 100 $m^2/g$.

11. The method of claim 1, wherein the polystyrene consists of post-consumer waste polystyrene.

12. The method of claim 1, wherein the polystyrene is post-consumer waste polystyrene that is contaminated sugar, starch, protein, nucleic acid, lipid, other food component, paint, ink, dye, paper, or non-polystyrene plastic contaminant, in a range of from 0.02 and 0.1 wt. %.

13. The method of claim 1, wherein a weight ratio of the polystyrene to the CNF is in a range of from 1:5 to 1:10.

14. The method of claim 1, wherein a weight ratio of the polystyrene to the CNF is in a range of from >1:10 to 1:50.

15. The method of claim 1, wherein the polystyrene is expanded or extruded polystyrene.

16. The method of claim 1, wherein the polystyrene-CNF composition comprises the CNF in a range of from 2 to 20 wt. %, relative to total polystyrene-CNF composition weight.

17. The method of claim 1, wherein the polystyrene-CNF composition comprises the CNF in a range of from 4 to 10 wt. %, relative to total polystyrene-CNF composition weight.

18. The method of claim 1, wherein the polystyrene is not crosslinked.

19. The method of claim 1, wherein the polystyrene is unmodified polystyrene.

20. The method of claim 1, wherein the passing is in liquid phase.

* * * * *